(12) United States Patent
James et al.

(10) Patent No.: US 11,987,511 B2
(45) Date of Patent: May 21, 2024

(54) WASTE PROCESSING APPARATUS AND METHODS OF MAKING AND USE

(71) Applicants: Jessica Lynn James, Fallon, NV (US); Tron Gale Huckaby, Fallon, NV (US)

(72) Inventors: Jessica Lynn James, Fallon, NV (US); Tron Gale Huckaby, Fallon, NV (US)

( * ) Notice: Subject to any disclaimer, the term of this patent is extended or adjusted under 35 U.S.C. 154(b) by 0 days.

(21) Appl. No.: 18/103,372

(22) Filed: Jan. 30, 2023

(65) Prior Publication Data

US 2023/0312380 A1 Oct. 5, 2023

Related U.S. Application Data

(60) Provisional application No. 63/381,550, filed on Oct. 28, 2022, provisional application No. 63/305,171, filed on Jan. 31, 2022.

(51) Int. Cl.
*C02F 1/68* (2023.01)
*C02F 103/00* (2006.01)

(52) U.S. Cl.
CPC ........ *C02F 1/688* (2013.01); *C02F 2103/005* (2013.01); *C02F 2307/08* (2013.01)

(58) Field of Classification Search
CPC .. C02F 1/688; C02F 1/00; C02F 1/006; C02F 2103/005; C02F 2307/08; C02F 1/68; C02F 1/52; C02F 2305/04; C02F 3/342; C09K 3/18; E03D 9/12; E03D 9/00; E03D 13/005; E03D 9/03; E03D 7/00; E04H 1/12; E04H 1/1216; A61K 33/14; A61K 33/00; A47K 11/12; A47K 11/04; A47K 11/02; A47K 11/00; E03B 7/12

USPC ........... 210/754; 4/321, 301, 353, 462, 664; 424/680

See application file for complete search history.

(56) References Cited

U.S. PATENT DOCUMENTS

| 4,043,931 | A | 8/1977 | Jeffrey et al. | |
|---|---|---|---|---|
| 5,251,342 | A * | 10/1993 | Sansom | A47K 11/12 |
| | | | | 4/449 |
| 6,042,817 | A | 3/2000 | Polunsky et al. | |
| 7,682,520 | B2 | 3/2010 | Devereux et al. | |
| 7,802,323 | B2 | 9/2010 | Al-Mutairi | |
| 11,033,649 | B2 | 6/2021 | Loebertmann et al. | |
| 2002/0035049 | A1 * | 3/2002 | Suri | C11D 3/50 |
| | | | | 510/447 |

(Continued)

FOREIGN PATENT DOCUMENTS

| IN | 201811016440 A | 8/2020 |
|---|---|---|
| JP | 2000017130 A | 7/2000 |

OTHER PUBLICATIONS

International Search Report and Written Opinion of The International Searching Authority for International Application PCT/US2023/011908, dated Jul. 19, 2023.

(Continued)

*Primary Examiner* — Akash K Varma
(74) *Attorney, Agent, or Firm* — Holland & Hart LLP

(57) ABSTRACT

Various aspects of this disclosure relate to toilet systems that include compositions to inhibit wastewater from freezing in a waste tank of a toilet. A first fluid treatment composition comprises a salt that is introduced into the waste tank. A second fluid treatment composition is a solid composite that also comprises a salt and that is introduced into a urinal in fluid communication with the waste tank.

20 Claims, 6 Drawing Sheets

(56) References Cited

U.S. PATENT DOCUMENTS

| | | | |
|---|---|---|---|
| 2007/0259799 A1* | 11/2007 | Kubalik | C11D 3/50 |
| | | | 510/192 |
| 2008/0190457 A1 | 8/2008 | Veltman et al. | |
| 2009/0100585 A1 | 4/2009 | Roberts | |
| 2009/0211002 A1 | 8/2009 | Norgaard | |
| 2010/0125936 A1* | 5/2010 | Hunter | C11D 3/48 |
| | | | 4/231 |
| 2011/0162134 A1 | 7/2011 | Hunter | |
| 2011/0219525 A1 | 9/2011 | Burt et al. | |
| 2011/0289671 A1* | 12/2011 | Westrick | A47K 11/02 |
| | | | 4/476 |
| 2016/0032180 A1 | 2/2016 | Agrawal et al. | |
| 2018/0134998 A1 | 5/2018 | Norman et al. | |
| 2019/0071855 A1 | 3/2019 | Andrews | |
| 2021/0131087 A1 | 5/2021 | Hibbs | |
| 2022/0035049 A1 | 2/2022 | Nakamura et al. | |

OTHER PUBLICATIONS

The Wayback Machine—https://ace1965.com/2021/01/what-to-know-about-winterizing-portable-restrooms/; What to Know About Winterizing Portable Restrooms; Ace Diversified Services.

Brenda Land, Joe Fleming; Magnesium Chloride Toilet Vault Treatment: A Means To Inhibit Freezing In Outdoor Toilet Vaults; https://www.fs.fed.us/t-d/pubs/pdf/hi_res/08231301hi.pdf; Mar. 2008.

Frank Lewis; How To Make Bath Bombs Harder (3 Easy Tips); https://showerplusbath.com/how-to-make-bath-bombs-harder/; Jan. 25, 2021.

Jennafer Ashley; No-Scrub DIY Toilet Bombs (4-Ingredients);https://blog.paleohacks.com/toilet-bombs/; Jul. 13. 2018.

\* cited by examiner

WASTE PROCESSING APPARATUS AND METHODS OF MAKING AND USE

CROSS-REFERENCE TO RELATED APPLICATIONS

This patent application claims priority to U.S. Provisional Patent Application No. 63/305,171, filed Jan. 31, 2022, and U.S. Provisional Patent Application No. 63/381,550, filed Oct. 28, 2022, each of which is incorporated by reference in its entirety.

FIELD OF THE INVENTION

The present application is directed to a waste processing apparatus and its methods of making and use, and, in one embodiment in particular, to a portable waste processing system for a portable toilet including a first urinal/toilet fluid treatment component for a fluid holding tank and, optionally, a second cooperative holding tank fluid treatment system for an optional urinal in the portable toilet.

BRIEF IDENTIFICATION OF SOME ASPECTS OF THE BACKGROUND

Portable toilets are old in the art and have long been widely used. One common portable toilet structure has a portable housing with door access into the housing interior and a urinal and toilet, with the toilet directly above a waste holding tank, which commonly contains a waste processing fluid. Waste from the urinal and toilet is deposited into the waste holding tank to combine with the waste processing fluid in the tank. Such waste processing fluids have long included waste treatment compositions such as fragrance, colorant, and others. When used in colder environments, however, waste treatment fluid often must account for the freezing of the waste, which can create one or more of a variety of problems in the holding tank, emptying the holding tank, and cleaning and transporting the portable toilet.

One prior art solution has been for a portable toilet provider to pre-mix salt and water to yield a brine solution that resists freezing when combined with waste. The provider fills a mixing tank with water, adds salt (for example, by pouring the salt from 40-pound heavy-duty bags), and agitates or stirs the mixture with heavy-duty mixing and stirring equipment until the salt is dissolved in the water, yielding a brine solution. The provider then checks the salinity of the brine solution and adds additional salt if needed. During or after this process, the provider often also similarly adds and mixes fragrance, colorant, and waste processing enzymes into the brine solution. Once the correct salinity is achieved and the full mixing process has taken place, the provider then typically pumps the brine and otherwise treated solution from the mixing tank into the provider's delivery truck or trucks. This is because, due to the need for heavy duty mixing/agitation equipment, most commonly the brine and otherwise treated solution cannot reasonably or efficiently be made in the trucks or at the place to which the portable toilet will be transported by the trucks for installation and for use.

Consequently, the delivery truck or trucks commonly have, in addition to facilities for transporting of the empty portable toilet(s), separate brine solution storage facilities for transporting a heavy and voluminous brine solution to the place of intended use for the portable toilet. The pre-made brine solution is then pumped from a delivery truck into holding tanks of empty portable toilets after installation of the empty portable toilets at the place of intended use.

One common delivery truck used in such processes has three large compartments of tanks, which include a tank for brine solution, a tank for fresh water for use in cleaning the portable toilets prior to transporting them away from a place of use, and a tank for wastewater flushed from the portable toilets during the cleaning. The costs of such three-compartment trucks are substantial as is the cost of operating and transporting them.

BRIEF SUMMARY OF SOME ASPECTS OF THIS SPECIFICATION

The applicants believe they discovered at least some of the problems with the prior art, or their severity, identified in the Background section above.

This disclosure describes a kit to inhibit waste from freezing in toilets such as portable toilets. The kit includes two components that each reduce the freezing point of liquid waste. A first component is a salt concentrate, which is provided for use in a waste tank. The first component combines with liquid waste upon use of the toilet, and the salt inhibits the liquid waste from freezing. A second component is a solid composite that comprises salt, which is provided for use in a urinal. The salt dissolves in liquid waste upon use of the urinal and inhibits the liquid waste from freezing.

The combination of the first component and the second component inhibits liquid waste from freezing both in the waste tank and in plumbing that connects the urinal to the waste tank. Frozen waste is problematic for flushing and pumping waste to empty and clean a toilet, and the kit therefore facilitates emptying and cleaning waste tanks at freezing temperatures. Even if liquid waste nevertheless freezes, the two components decrease the melting point of frozen waste, which reduces, for example, the time and hot water necessary to melt the frozen waste and therefore reduces cleaning time.

The second component is particularly effective at rapidly combining salt with liquid waste in a urinal to inhibit liquid waste from freezing in plumbing that connects the urinal to a waste tank.

The second component also improves mixing of salt with waste in the waste tank. Waste from the toilet and urinal generally first contact an upper portion of waste in the waste tank. Waste in the waste tank may therefore become approximately stratified. In the absence of the second component, the waste may become stratified such that the upper portion comprises a lesser salt concentration than lower portions of waste, which limits the effectiveness of the first component. The second component allows an addition of salt to the upper portion of the waste such that salt is more evenly distributed in the waste, which increases the effectiveness of the combined components relative to a single component. Even if a frozen, reduced-salt layer forms in the upper portion of the waste, body temperature liquid waste from the urinal can melt the layer (or a portion thereof) to allow mixing with the salt and inhibit the frozen, reduced-salt layer from reforming or enlarging. Even if portions of the waste freeze in the waste tank, the second component generally favors the formation of a slush, which is easier to pump and melt relative to blocks of frozen waste. In the absence of the second component, a probability increases that a block of frozen waste will form and float in waste of the waste tank, which is challenging to pump and melt relative to a slush. Ice notably floats in water due to their difference in density, and the difference in density between ice and brine is even greater.

The two components are generally provided as single-use portions. One or more single-use portions of the first component are generally used in a single waste tank, and a single-use second component is generally used in a single urinal. Single-use portions can be provided as solids, which have significantly less mass than brine solutions that were historically used to inhibit waste from freezing in toilets, and solids therefore reduce the space and fuel required to transport the components. Solid alternatives to brine solutions may not have been historically operable, for example, because of the confounding stratification issue identified above.

The two components are generally provided as solids. Solids are compatible with fragrances that are immiscible with aqueous liquids including both liquid waste and brine. Immiscible fragrances can be selected to float on top of liquid waste to better mask unpleasant odors. Immiscible fragrances display reduced compatibility with brine of the prior art because immiscible fragrances typically separate from and float on top of the brine, which impairs reproduceable metering of the immiscible fragrances in brine at constant concentrations from bulk transport tanks. Single-use portions in liquid formats also display improved compatibility with immiscible fragrances relative to bulk liquid formats because they lack any need for metering.

There are other novel aspects and features disclosed in this application. They will become apparent as this specification proceeds.

In this regard, it is to be understood that the scope of the invention is not to be limited to a given aspect or feature because it is recited in this Brief Summary or the Background section. Rather, the scope of the invention is to be determined by the claims as issued.

BRIEF DESCRIPTION OF THE DRAWINGS

The inventors' preferred and other embodiments are disclosed in this specification in association with accompanying drawings in which.

DETAILED DESCRIPTION

Figure 1:
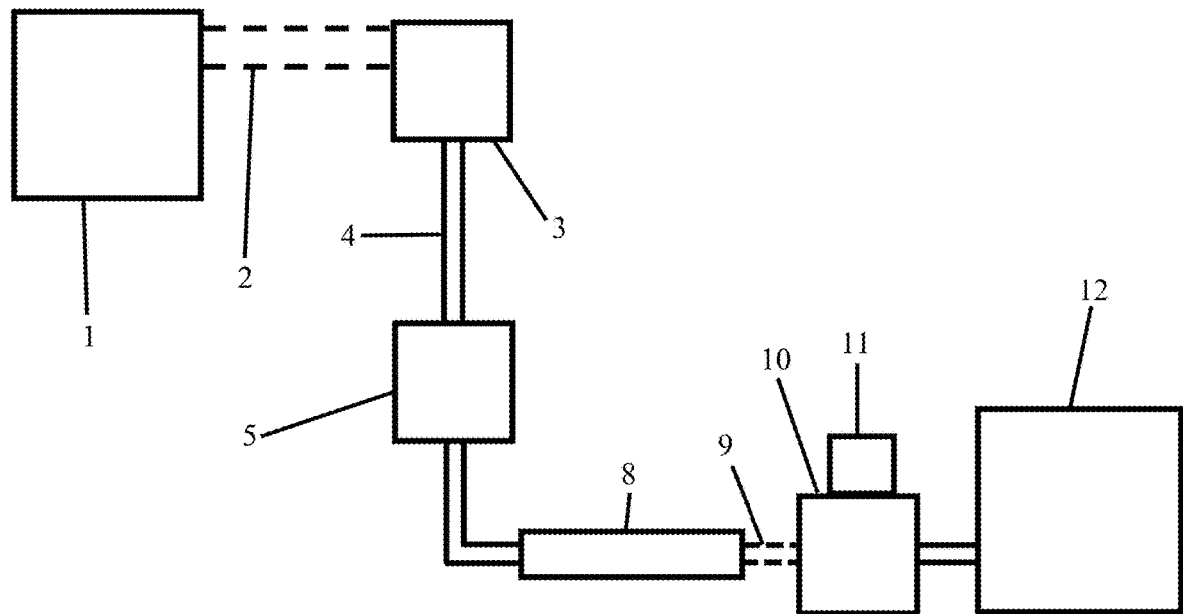
FIG. 1 is a schematic drawing of a manufacturing system to produce a batch of first fluid treatment compositions for use in the waste tanks of toilets.

The inventors believe they discovered problems with prior art portable toilet treatment systems for use in colder environments in particular. The inventors therefore developed the following options for solving such problems (among other features disclosed in this specification):

1. use of a first fluid treatment composition for treatment of portable toilet fluid, such as water, loaded into the fluid holding tank of a portable toilet at a place of installation of the portable toilet; and/or
2. use of a second fluid treatment composition in a portable toilet urinal at the place of installation of the portable toilet.

In some embodiments, implementing both of the foregoing two options, the first fluid treatment composition and second fluid treatment composition, include one or more components to inhibit freezing of fluid and waste in the portable toilet fluid holding tank, portable toilet urinal, plumbing from the urinal to the holding tank, plumbing connected to the holding tank to flush fluid and/or waste from the holding tank, and/or possible downstream waste holding and/or treating structure or equipment.

In some embodiments, the first fluid treatment composition and second fluid treatment composition can include one, some, or all of the following, optionally with the following or other related effects when mixed with holding tank fluid and waste and urinal fluids:

sodium chloride, which inhibits ice formation and deodorizes the mixtures;

magnesium chloride, which inhibits freezing of the mixtures;

colorant, to color and mask the appearance of waste in the holding tank and urine in the urinal, including optionally urine stains in the urinal, which colorant is generally included in the second fluid treatment composition for use in the urinal;

fragrance, to reduce, and in some embodiments, mask or even eliminate, odor from urine and waste; and enzymes or other chemicals, to aid in further treating waste such as by breaking down the waste or otherwise altering waste to provide one or more of reduced odor, ease of flushing of the urinal and holding tank, and ease of transporting and subsequently processing or disposing of flushed-out waste.

In some embodiments, the first fluid treatment composition is pre-packaged in a bag or container that is dissolvable in treatment fluid in the holding tank. In one embodiment, in which the treatment fluid is or includes water, the bag can be partially or wholly comprised of polyvinyl alcohol ("PVA").

Alternative structures in which the first fluid treatment composition could be provided include dried loose materials in a differing type of container, box, or bag and poured, shoveled, or pumped from such a structure into the holding tank of the portable toilet. The first fluid treatment composition could also be provided as a pre-dissolved liquid version and similarly stored and delivered.

In some embodiments, the second fluid treatment composition can be pre-processed into one or more compressed and hardened elements or pucks. In some embodiments, a hardener can be added to, and mixed into, the second fluid treatment composition to facilitate and maintain the hardened elements or pucks while allowing sufficient mixing of hardened elements or pucks with urine and other fluid, such as water in the holding tank. Some embodiments may utilize potassium bitartrate as a hardener.

Alternative structures in which the second fluid treatment composition could be provided include pre-pressed pellets or differently-shaped bricks or pucks.

In some systems including use of both a pre-packaged first fluid treatment composition in the holding tank and a hardened second fluid treatment composition in the urinal, the latter can not only treat and, for example, inhibit freezing fluid or waste of the urinal and of plumbing from the urinal to the holding tank, but also further aid in treating and, for example, inhibit freezing of fluid or waste in the holding tank and/or in other plumbing and related equipment and containment processing structure when the holding tank is flushed of fluid and waste during cleaning of the portable toilet.

In some embodiments, the above identified components, when and as utilized, can include or consist essentially of:
- sodium chloride (for example, Huck Salt Kiln Dried Fine (Huck Salt Company, Nevada, USA));
- magnesium chloride (for example, EnviroTech Meltdown-Liquid magnesium chloride at a 33% concentration (EnviroTech Services Inc., Colorado, USA));
- colorant (for example, LIQUITINT™ (Milliken & Company, South Carolina, USA));
- fragrance (for example, Apple Aire (Sunrise Environmental Scientific, Nevada, USA));
- enzymes (for example, Hydrofoil (Sunrise Environmental Scientific)); and
- hardener (for example, Cream of Tartar/Potassium Bitartrate (Crafter's Choice, Ohio, USA)).

Additions to, or alternatives for, such salt and magnesium chloride, may include:
Magnesium Chloride Hexahydrate
Calcium Magnesium Acetate
Urea
Calcium Chloride
Potassium Chloride
Sodium Formate
Sodium Acetate
Corn Derived Corrosion Inhibitor/Enhancer
Potassium Formate
Sodium Silicate
Molasses
Potassium Sulfate
Sodium Gluconate
Beet Juice
Saline In some embodiments, apportioned formats of fluid treatment compositions are advantageous over bulk formats, for example, because freezing-point-reducing ingredients such as sodium chloride are generally immiscible with fragrances, which can lead to separation of the ingredients and fragrances in bulk formats.

In some embodiments, solid formats of fluid treatment compositions are advantageous over liquid formats, for example, because freezing-point-reducing ingredients such as sodium chloride are generally immiscible with fragrances, which can lead to separation of the ingredients and fragrances in liquid formats.

Other compositions providing for reducing the freezing point of fluids, such as the freezing point of water, used in portable toilets or deposited into such toilets will be immediately recognized by those of skill in the relevant arts upon review of this description.

Exemplary Novel Methods of Making and Use of the First Fluid Treatment Composition:

In some embodiments of a novel method of making the first fluid treatment composition, the method can utilize the following components to make a batch of the first fluid treatment composition;

| Sodium Chloride: | 1,830 pounds of Huck Salt Kiln Dried Fine (for example, largely containing salt crystals of 0.125 inches or less maximum width, height, and depth) |
|---|---|
| Magnesium Chloride: | 128 fluid ounces of Envirotech Meltdown liquid magnesium chloride at 33 percent magnesium chloride concentration |
| Colorants: | 4 fluid ounces of LIQUITINT ™ Agro Blue 8 fluid ounces of LIQUITINT ™ Red ST |
| Enzymes: | 64 fluid ounces of Hydrofoil |
| Fragrance: | 192 fluid ounces of Apple Aire |

To manufacture such a batch, a front loader can lift the kiln dried salt, fill a bin, and, then from the bin, the salt can gravity feed to a conveyor belt. The conveyor belt can, depending on the salt crystal size, feed another conveyor belt or roller mill, which can be adjusted to adjust the quantity fed into the subsequent system. This latter conveyor or roller mill drops the salt into another bin that has a screen configured to inhibit large salt crystals (for example, greater in size than as specified above) from then dropping, by gravity feed, from this bin into a mixing auger. A spray system attached to the auger sprays the magnesium chloride, colorant, fragrance, and enzymes into the auger, which mixes the components into a wet mixture of all such components. The auger then feeds the resulting mixture onto another conveyor belt, which feeds the mixture into a trommel screen and, depending on the weather conditions, either no air, air, or air and heat will be blown through the trommel screen to remove some of the moisture from the batch. The trommel then feeds a conveyor belt that then feeds a bin/storage area. The batch in the bin may then be picked up by a tractor and loaded into another bin. This later bin can gravity feed the batch into a bucket elevator system that takes the mixture to a multi-head weigher section of a machine, which can then fill, for example, polyvinyl alcohol bags with a pre-determined amount of the mixture in each such bag. The machine can then seal the polyvinyl alcohol bags, and then a conveyor belt can move the bags from the machine to a packaging table. An exemplary resulting polyvinyl alcohol bag containing the resulting first fluid treatment composition weighs about 22 ounces, which is lightweight and low volume, and thus, easy to store, transport, and use even in high volumes.

Many other approaches can be used in the making of a first fluid treatment composition. For example, a kiln may be used to dry the mixture, and a different bagging/packaging system could be used.

Exemplary Novel Methods of Making and Use of the Second Fluid Treatment Composition:

In some embodiments of a novel method of making the second fluid treatment composition, the method can utilize the same amounts of components identified above for the First Fluid Treatment Composition (i) except the Huck Salt Kiln Dried Fine largely contains salt crystals of 0.125 inches or less maximum width, height, and depth, and (ii) also including hardener in the amount of 0.25 to 0.5 ounce per puck of Cream of Tartar/Potassium Bitartrate (available, for example, from Crafter's Choice). Note that larger salt crystals can require a longer time for the salt crystals to sufficiently dissolve in water or other fluids.

Figure 4:
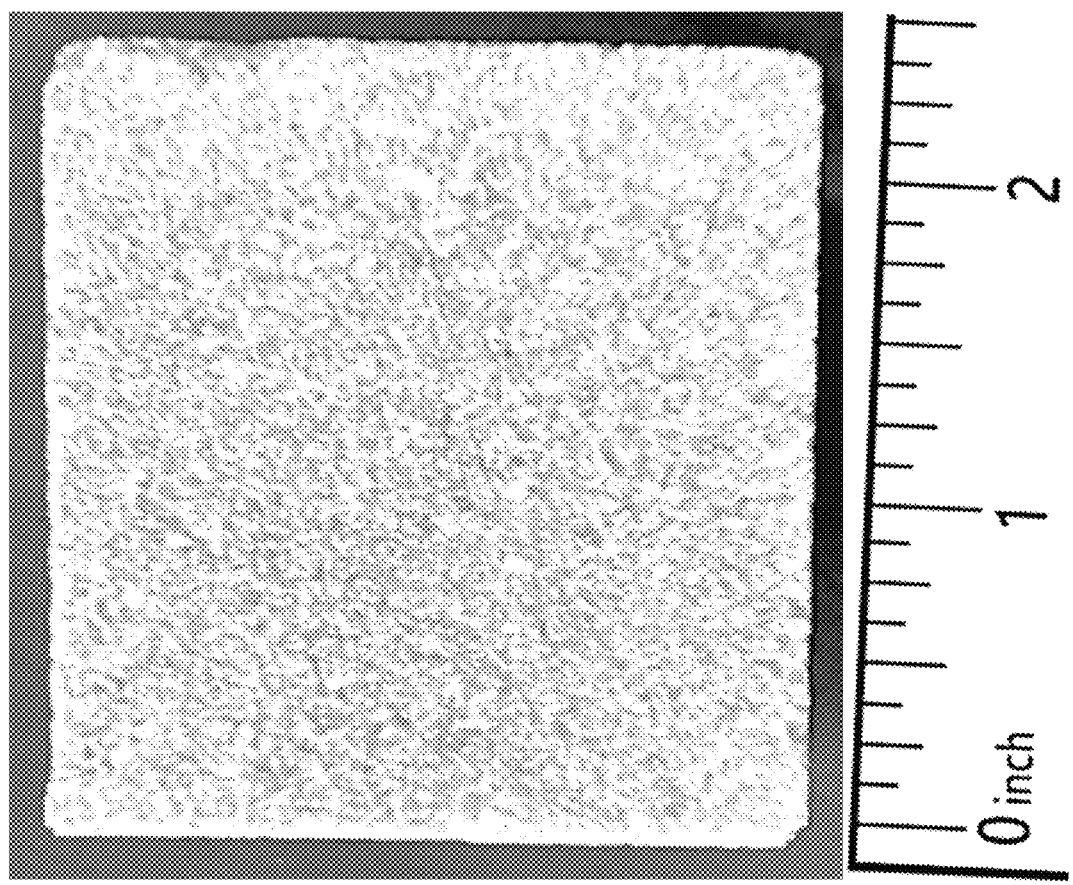
FIG. 4 is an image of a second fluid treatment composition that is a solid composite.
Figure 5:
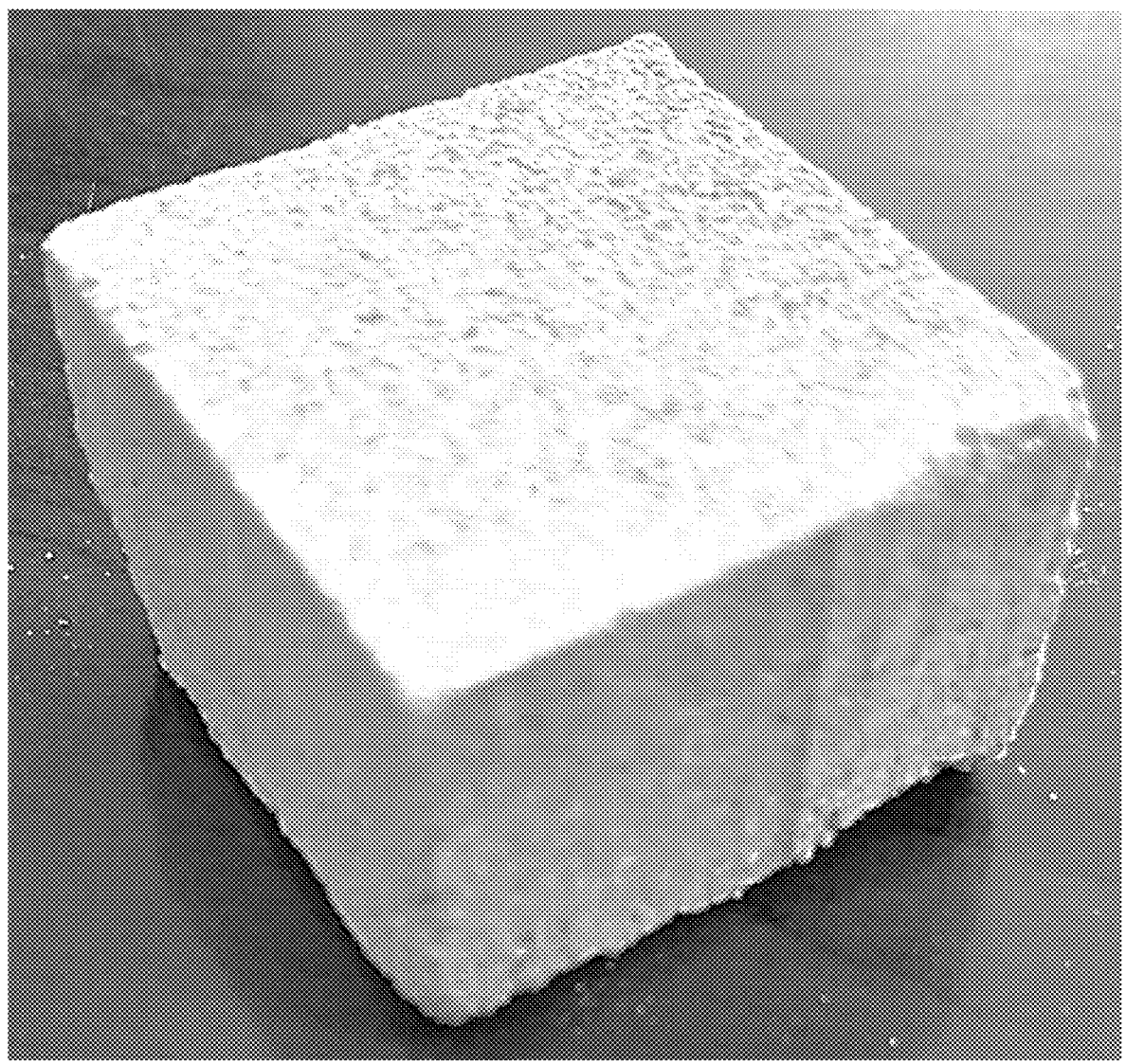
FIG. 5 is an image of a second fluid treatment composition that is a solid composite, which is the same second fluid treatment composition as depicted in FIG. 4, and which is shown at a different angle to depict its three-dimensional structure, which is a rectangular cuboid three-dimensional structure.

One embodiment of the method of making the second fluid treatment composition can include the same method as set forth above for the first fluid treatment composition through to the section just after spraying the magnesium chloride, colorant, and fragrance into the auger and mixing the resulting mixture with salt in the auger to yield a relatively uniform distribution of the mixture components, which have a similar consistency as wet sand following the mixing. The auger then feeds the resulting mixture onto another conveyor that feeds a rotatable trommel that includes three angle irons welded to the interior trommel side wall, spaced substantially apart from each other and parallel to, and running laterally along, the axial length of the trommel. Before the batch enters the trommel, the hardener is added to the mixture at the top of the trommel, and this causes the hardener to mix into the mixture of the batch as the mixture components travel along the downwardly inclined, spinning trommel. Depending on the weather condition, either no air, air, or air and heat will be used in, or blown through, the trommel screen to remove some of the moisture from the batch being made. The trommel then feeds a conveyor belt that then feeds a bin/storage area, which in turn feeds a bin on a puck press machine. The puck press machine then auto fills, presses, and ejects pucks of the mixture. Then the pucks can sit or be packaged right away. The puck press machine can be a hookah charcoal making machine, in some embodiments, optionally with molds purchased form the manufacturer of the hookah charcoal making machine. An exemplary resulting puck is shown in FIGS. 4 and 5 and weighs about 4 ounces, which is lightweight and low volume, and thus, easy to store, transport, and use even in high volumes.

The above-described specific formulas for a first and/or second fluid treatment compositions can inhibit water and associated waste in the holding tank, urinal (if any), and associate plumbing and pumping or treating equipment from freezing at surrounding environmental temperatures of 14 degrees Fahrenheit (−10 degrees Celsius) and above, such as is commonly the case in colder climates. The formula can be altered to accommodate different surrounding environmental temperatures, such as by providing a higher concentration of salt, magnesium chloride, and/or other component for inhibiting freezing of fluid of a waste tank of a toilet.

Varying the concentration of colorant in a given composition can change the clarity of the holding tank water or other fluid(s) and impact the amount of apparent urine staining of the puck or other second fluid treatment composition. Similarly, altering any of the fragrance, salt, and, for example, magnesium chloride can change the effectiveness of odor control/blocking provided by these components.

Water-based colorant is identified in the specified formulas set forth above. Oil based colorant may be utilized in addition or in the alternative, but oil-based colorants can, in at least some embodiments, undesirably separate from other holding tank fluid and waste, increasing visibility of the waste. In comparison, oil-based fragrance separation can cause the fragrance to float on top the holding tank water, helping to reduce or eliminate undesired odor.

Exemplary Novel Use:

In some embodiments, a provider delivers a clean, empty portable toilet to a desired location for use of the portable toilet at the desired location. The provider may fill about half of a 5-gallon bucket with water provided either at or near that location (such as from a water delivery system at that location and without need for the provider to provide any water for use in the portable toilet by, for example, a different provider or other delivery truck). The provider may then place in the water in the bucket a single unit of the first fluid treatment composition. The first fluid treatment composition will then begin to dissolve. Polyvinyl alcohol advantageously dissolves in water.

While the first fluid treatment composition is dissolving, if desired and if the portable toilet has a urinal, the provider can place a second fluid treatment composition into the urinal of the portable toilet. The provider can either then or otherwise pour the bucket of water, along with the first fluid treatment composition from the bucket into the empty holding tank of the portable toilet. The provider can then add to the holding tank additional water as needed. Agitation will assist any of the remaining first fluid treatment composition to dissolve.

Bubbles may appear when adding additional water to the holding tank. To avoid bubbles, the provider or other entity can pour more water from the bucket or from a hose, for example, toward one or more sides of the holding tank.

Both the first and second fluid treatment compositions can not only reduce or eliminate freezing of urine or other fluids in the urinal and associated plumbing, but also enhance the efficacy of the first fluid treatment composition in the holding tank and any associated plumbing in the holding tank or connected to the holding tank, such as during evacuation of the holding tank and any subsequent operations involving transportation or processing of fluid and waste from the holding tank. Further, any unused portion of the second fluid treatment composition, and in particular a puck or other solid such composition, can be easily removed from the urinal for cleaning of the urinal or otherwise as desired, such as, for example, at the conclusion of use of a portable toilet having a urinal at a given location.

The first and second fluid treatment compositions can be, in some embodiments, such as the particular polyvinyl alcohol and solid composite embodiments disclosed herein, used in any weather environments. Users need only acquire, store, utilize, etc. one or both such compositions.

Use of some embodiments of the first fluid treatment composition and, if desired, the second fluid treatment composition can allow providers to require only a two- or one-compartment transport or delivery truck. One compartment can be used for holding waste and fluid removed from a used portable toilet, and, if the provider does not use a differing water supply such as locally at the use location, then a second compartment can carry fresh water or other fluid, such as to provide holding tank water or fluid and to pump out waste and fluid from a used portable toilet. In many embodiments, there would be no need for a third compartment for brine water, which is only needed for winter season; or for the time, labor, and facilities needed for making brine water.

Further, trucks can carry more fresh water and clean more toilets, and clean them faster, because of the increased water supply. Further, by use of more efficacious first and second fluid treatment compositions, complications are mitigated, including time consumption, for example, due to freezing of urine and holding tank fluid and waste.

The waste processing apparatus and methods of making and use may be used in other types of portable toilets and in fixed toilet structures as well. For example, they may be used in connection with recreational vehicle ("RV"), boat, and other outdoor toilets such as those that are exposed to freezing temperatures. They may also be used in connection with fixed toilets, such as in outhouses, tent toilets, campground toilets, and any other toilets where prevention of freezing of urine, waste, or related processing materials or facilities may be of benefit.

Example of a Manufacturing Method to Produce a Batch of First Fluid Treatment Composition:

FIG. 1 is a schematic drawing of a manufacturing system to produce a batch of first fluid treatment compositions for use in the waste tanks of toilets.

In some embodiments, sodium chloride is used to fill a bin 1, which feeds onto a conveyor 2. In some specific embodiments, the sodium chloride is anhydrous sodium chloride. In some very specific embodiments, the sodium chloride is kiln-dried salt.

In some embodiments, the conveyor 2 feeds another bin 3, which can be adjusted to adjust the quantity of sodium chloride used in a resultant composition. Depending on the size of the sodium chloride, the bin 3 can optionally either feed into a mill (such as a roller mill) to reduce the size of the sodium chloride or feed onto another conveyor, for example, to separate the sodium chloride by size.

In some embodiments, the conveyor 2 feeds the sodium chloride into a bin 3 that has a screen to inhibit sodium chloride that is greater than a threshold size from entering a downstream mixing auger 4, such as a threshold size greater than 3.5 millimeters or greater than 3.2 millimeters.

In some embodiments, the sodium chloride has an average size that is up to 3.5 millimeters. In some specific embodiments, the sodium chloride has an average size that is up to 3.2 millimeters. In some very specific embodiments, the sodium chloride is processed or selected such that it has an average size that is up to 3.5 millimeters such as up to 3.2 millimeters.

In some embodiments, the sodium chloride is fed into a mixing auger 4.

In some embodiments, the mixing auger 4 mixes the sodium chloride and additives.

In some embodiments, a spray system is in fluid communication with the mixing auger 4 such that the spray system introduces additives into the mixing auger 4.

In some embodiments, the additives include one or more of colorants, fragrance, magnesium chloride solution, and enzymes (such as one or more proteases, lipases, amylases, cellulases, ureases, and xylanases, or such as by providing bacteria that comprise the enzymes). In some specific embodiments, the spray system introduces one or more of colorants, fragrance, magnesium chloride solution, and enzymes into the mixing auger 4. In some specific embodiments, the spray system introduces one or more of colorants, fragrance, magnesium chloride solution, and enzymes into the mixing auger 4 such that the mixing auger 4 mixes the sodium chloride with one or more of the colorants, the fragrance, the magnesium chloride solution, and the enzymes.

In some embodiments, the mixing auger 4 feeds into a second mixing auger 5. In some specific embodiments the mixing auger 4 feeds into a second mixing auger 5, which continues to mix the sodium chloride with one or more of the colorants, the fragrance, the magnesium chloride solution, and the enzymes.

In some embodiments, the second mixing auger 5 feeds into a trommel screen 8. In some specific embodiments, the second mixing auger 5 feeds into the trommel screen 8 to optionally remove water from the mixture. In some even more specific embodiments, the second mixing auger 5 feeds into the trommel screen 8 to optionally remove water from the mixture by optionally directing air through the trommel screen 8. In some very specific embodiments, the second mixing auger 5 feeds into the trommel screen 8 to optionally remove water from the mixture by optionally directing heated air through the trommel screen 8.

In some embodiments, the trommel screen 8 feeds a conveyor 9 that feeds a third mixing auger 10 with an attached bin 11, which feeds magnesium chloride (such as magnesium chloride flakes) into the third mixing auger 10 to combine the mixture fed from the trommel screen 8 with the magnesium chloride to form a final composition.

In some embodiments, the third mixing auger 10 feeds the final composition into a storage bin 12.

In some embodiments, the first fluid treatment composition is a final composition.

In some embodiments, the first fluid treatment composition is a final composition that is encased by a surface barrier such as a polyvinyl alcohol bag.

In some embodiments, the storage bin 12 is used to fill another bin, which is used to feed a machine that fills polyvinyl alcohol bags.

Figure 3:
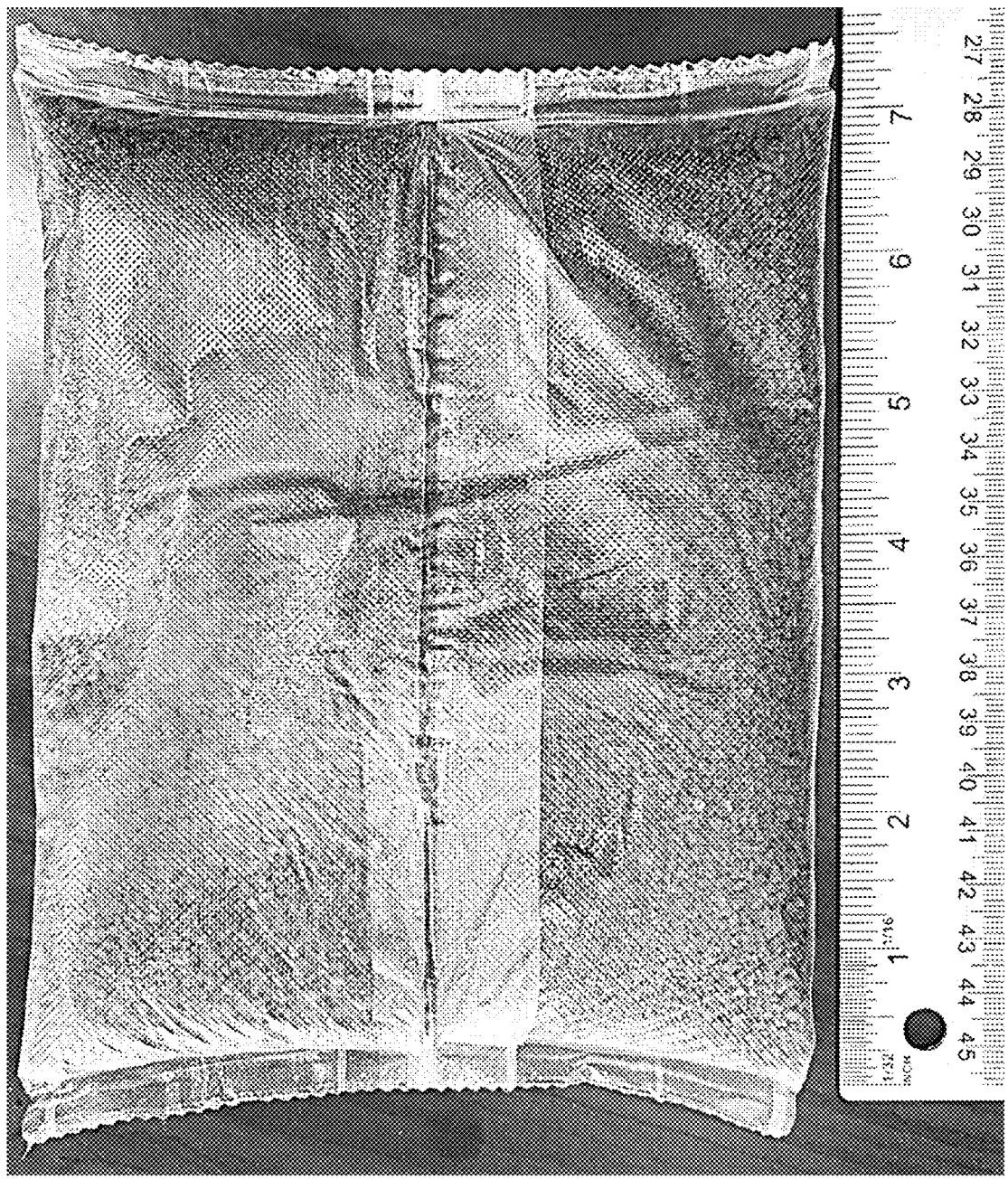
FIG. 3 is an image of a first fluid treatment composition that comprises particles and a surface barrier.

In some embodiments, each polyvinyl alcohol bag is filled with at least 100 grams and up to 1 kilogram of the final composition. In some specific embodiments, each polyvinyl alcohol bag is filled with at least 300 grams and up to 900 grams of the final composition. In some very specific embodiments, each polyvinyl alcohol bag is filled with at least 500 grams and up to 700 grams of the final composition. FIG. 3 depicts an image of a representative first fluid treatment composition that comprises a polyvinyl alcohol bag (which is a surface barrier).

Examples of First Fluid Treatment Compositions:

Various aspects of this disclosure relate to a first fluid treatment composition that is configured for use with a toilet. In some specific embodiments, the first fluid treatment composition is configured for use with a toilet that comprises a waste tank that is configured for use at temperatures below 0 degrees Celsius. In some specific embodiments, the first fluid treatment composition is configured for use with a toilet that comprises a waste tank, which does not connect to a sewer or septic tank (and which waste tank is also referred to as a holding tank herein). In some very specific embodiments, the first fluid treatment composition is configured for use with a toilet that comprises a waste tank, which does not connect to a sewer or septic tank such that waste must be removed from the waste tank.

In some embodiments, the first fluid treatment composition is configured to disperse in an aqueous liquid such that the first fluid treatment composition reduces the freezing point of the aqueous liquid by at least 1 degree Celsius per 100 grams of the first fluid treatment composition per liter of the aqueous liquid. In some specific embodiments, the first fluid treatment composition is configured to disperse in an aqueous liquid such that the first fluid treatment composition reduces the freezing point of the aqueous liquid by at least 2 degrees Celsius per 100 grams of the first fluid treatment composition per liter of the aqueous liquid. In some very specific embodiments, the first fluid treatment composition is configured to disperse in an aqueous liquid such that the first fluid treatment composition reduces the freezing point of the aqueous liquid by at least 4 degrees Celsius per 100 grams of the first fluid treatment composition per liter of the aqueous liquid. In some embodiments, the aqueous liquid comprises or consists of biological waste of the type received by a toilet.

In some embodiments, at least 50 percent by mass of the first fluid treatment composition has a solubility in water at 0 degrees Celsius of at least 100 grams per liter. In specific some embodiments, at least 70 percent by mass of the first fluid treatment composition has a solubility in water at 0 degrees Celsius of at least 100 grams per liter. In very specific some embodiments, at least 90 percent by mass of the first fluid treatment composition has a solubility in water at 0 degrees Celsius of at least 100 grams per liter.

In some embodiments, the first fluid treatment composition comprises sodium chloride.

In some embodiments, the first fluid treatment composition comprises sodium chloride at a concentration of at least 50 to 99.99 percent by mass. In some specific embodiments, the first fluid treatment composition comprises sodium chloride at a concentration of at least 70 to 99.9 percent by mass. In some very specific embodiments, the first fluid treatment composition comprises sodium chloride at a concentration of at least 90 percent to 99.9 percent by mass.

In some embodiments, the fluid treatment composition comprises water.

In some embodiments, the first fluid treatment composition comprises water at a concentration of at least 5 parts per million and up to 5 percent by mass. In some specific embodiments, the first fluid treatment composition comprises water at a concentration of at least 10 parts per million and up to 2 percent by mass. In some very specific embodiments, the first fluid treatment composition comprises water at a concentration of at least 20 parts per million and up to 1 percent by mass.

In some embodiments, the first fluid treatment composition comprises magnesium chloride.

In some embodiments, the first fluid treatment composition comprises magnesium chloride at a concentration of at least 5 parts per million and up to 40 percent by mass. In some specific embodiments, the first fluid treatment composition comprises magnesium chloride at a concentration of at least 10 parts per million and up to 10 percent by mass. In some very specific embodiments, the first fluid treatment composition comprises magnesium chloride at a concentration of at least 20 parts per million and up to 1 percent by mass.

In some embodiments, the first fluid treatment composition comprises a colorant. The colorant is not limiting, and representative colorants include LIQUITINT™ colorants (Milliken & Company), which may optionally be combined to arrive at a desirable color profile. The term "colorant" refers to both individual colorants and combinations thereof.

In some embodiments, the first fluid treatment composition comprises the colorant at a concentration of at least 1 part per million and up to 2 percent by mass. In some specific embodiments, the first fluid treatment composition comprises the colorant at a concentration of at least 5 parts per million and up to 1 percent by mass. In some very specific embodiments, the first fluid treatment composition comprises colorant at a concentration of at least 10 parts per million and up to 0.5 percent by mass.

In some embodiments, the first fluid treatment composition comprises a fragrance. The fragrance is not limiting, and representative fragrances include Apple Aire (Sunrise Environmental Scientific). The term "fragrance" refers to both individual fragrances and combinations thereof.

In some embodiments, the first fluid treatment composition comprises the fragrance at a concentration of at least 10 parts per million and up to 20 percent by mass. In some specific embodiments, the first fluid treatment composition comprises the fragrance at a concentration of at least 50 parts per million and up to 2 percent by mass. In some very specific embodiments, the first fluid treatment composition comprises fragrance at a concentration of at least 100 parts per million and up to 1 percent by mass.

In some embodiments, the first fluid treatment composition comprises enzymes. In some specific embodiments, the first fluid treatment composition comprises bacteria that comprise enzymes. In some very specific embodiments, the bacteria is viable, but the nature of the bacteria is not limiting, for example, because replication-incompetent bacteria may nevertheless comprise active enzymes.

In some embodiments, the first fluid treatment composition comprises one or both of ethylenediaminetetraacetate and a salt of ethylenediaminetetraacetate.

In some embodiments, the first fluid treatment composition comprises one or more surfactants. In some specific embodiments, the first fluid treatment composition comprises one or more anionic surfactants. In some even more specific embodiments, the first fluid treatment composition comprises one or more anionic surfactants that are hydrotropes. In some very specific embodiments, the first fluid treatment composition comprises one or more surfactants selected from alkyl sulfates, xylene sulfonates, alkyl benzene sulfonates, and one or more salts of alkyl sulfates, xylene sulfonates, and alkyl benzene sulfonates.

Use of Novel First Fluid Treatment Compositions:

In some embodiments, a first fluid treatment composition is dispersed in from 1 to 20 liters, and in one embodiment about 9.5 liters of water. In some embodiments, the dispersed composition is then poured into a tank or holding compartment of an outdoor toilet.

The dispersed composition inhibits waste (such as urine) from freezing, which is desirable because frozen waste significantly increases the time, labor, and materials necessary to clean an outdoor toilet. A first fluid treatment composition that is a polyvinyl alcohol bag that contains about from 100 to 1,000 grams, and in one embodiment, about 600 grams, of a final composition is generally capable of inhibiting waste from freezing at a temperature of −7 degrees Celsius (about 20 degrees Fahrenheit) when used in combination with a second fluid treatment composition as described herein. Two polyvinyl alcohol bags containing about 1200 grams total of a final composition are generally capable of inhibiting waste from freezing at a temperature of −12 degrees Celsius (about 10 degrees Fahrenheit) when used in combination with a second fluid treatment composition as described herein. Three polyvinyl alcohol bags containing about 1800 grams total of a final composition are generally capable of inhibiting waste from freezing at a temperature of −18 degrees Celsius (about 0 degrees Fahrenheit) when used in combination with a second fluid treatment composition as described herein.

In some embodiments, the polyvinyl alcohol bag is stable against degradation in the absence of added water for at least 1 month. In some specific embodiments, the polyvinyl alcohol bag is stable against degradation in the absence of added water for at least 2 months. In some very specific embodiments, the polyvinyl alcohol bag is stable against degradation in the absence of added water for at least 5 months.

In this specification, the term "stable against degradation in the absence of added water" refers to stability during storage and shipping such that the polyvinyl alcohol bag contains contents disposed within the polyvinyl alcohol bag.

In some embodiments, the polyvinyl alcohol bag comprises at least 1 gram and up to 10 grams of polyvinyl alcohol. In some specific embodiments, the polyvinyl alcohol bag comprises at least 1.5 grams and up to 5 grams of polyvinyl alcohol. In some very specific embodiments, the polyvinyl alcohol bag comprises at least 2 grams and up to 4 grams of polyvinyl alcohol.

In some embodiments, the polyvinyl alcohol bag has a thickness of at least 2 microns and up to 200 microns. In some specific embodiments, the polyvinyl alcohol bag has a thickness of at least 10 microns and up to 100 microns. In some very specific embodiments, the polyvinyl alcohol bag has a thickness of at least 20 microns and up to 80 microns.

In some embodiments, the first fluid treatment composition comprises at least 1 gram and up to 10 grams of polyvinyl alcohol. In some specific embodiments, the first fluid treatment composition comprises at least 1.5 grams and up to 5 grams of polyvinyl alcohol. In some very specific embodiments, the first fluid treatment composition comprises at least 2 grams and up to 4 grams of polyvinyl alcohol.

In some embodiments, the waste tank fluid treatment composition comprises at least 1 gram and up to 100 grams of polyvinyl alcohol. In some specific embodiments, the waste tank fluid treatment composition comprises at least 1.5 grams and up to 50 grams of polyvinyl alcohol. In some very specific embodiments, the waste tank fluid treatment composition comprises at least 2 grams and up to 25 grams of polyvinyl alcohol.

In some embodiments, the first fluid treatment composition comprises polyvinyl alcohol at a concentration of at least 0.1 percent and up to 5 percent by mass. In some specific embodiments, the first fluid treatment composition comprises polyvinyl alcohol at a concentration of at least 0.2 percent and up to 2 percent by mass. In some very specific embodiments, the first fluid treatment composition comprises polyvinyl alcohol at a concentration of at least 0.4 percent and up to 1 percent by mass.

In this specification "about" refers to a range of 50 percent of a number to 150 percent of the number.

Figure 2:
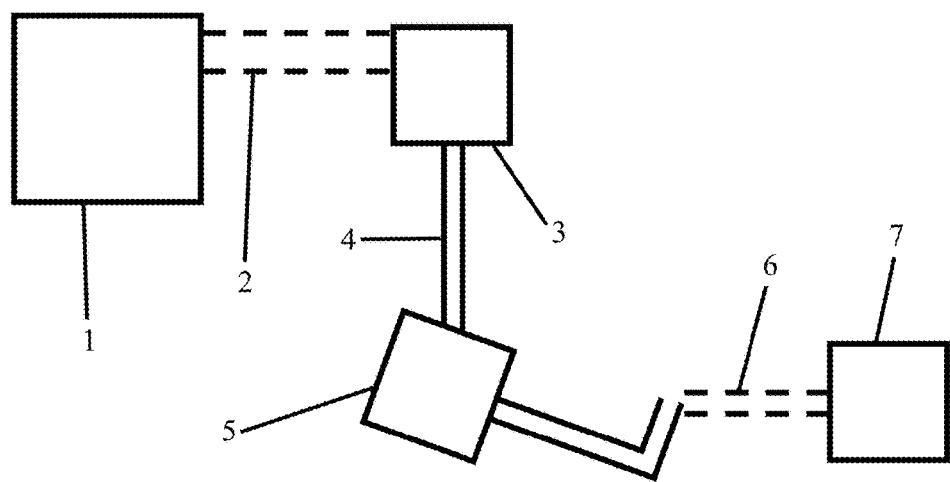
FIG. 2 is a schematic drawing of a manufacturing system to produce a batch of second fluid treatment compositions, which are solid composites for use in urinals.

Example of a Manufacturing Method to Produce a Batch of Second Fluid Treatment Compositions:

FIG. 2 is a schematic drawing of a manufacturing system to produce a batch of second fluid treatment compositions, which are solid composites for use in urinals. The manufacturing system shares the first five components of the manufacturing system used to produce batches of the first fluid treatment compositions, and the five shared components are depicted by reference numerals 1-5 in FIGS. 1 & 2.

In some embodiments, sodium chloride is used to fill a bin 1, which feeds onto a conveyor 2. In some specific embodiments, the sodium chloride is anhydrous sodium chloride. In some very specific embodiments, the sodium chloride is kiln-dried salt.

In some embodiments, the conveyor 2 feeds another bin 3, which can be adjusted to adjust the quantity of sodium chloride used in a resultant composition. Depending on the size of the sodium chloride, the bin 3 can optionally either feed into a mill (such as a roller mill) to reduce the size of the sodium chloride or feed onto another conveyor, for example, to separate the sodium chloride by size.

In some embodiments, the conveyor 2 feeds the sodium chloride into a bin 3 that has a screen to inhibit sodium chloride that is greater than a threshold size from entering a downstream mixing auger 4, such as a threshold size greater than 2 millimeters or greater than 1.6 millimeters.

In some embodiments, the sodium chloride has an average size that is up to 2 millimeters. In some specific embodiments, the sodium chloride has an average size that is up to 1.6 millimeters. In some very specific embodiments, the sodium chloride is processed or selected such that it has an average size that is up to 2 millimeters or up to 1.6 millimeters.

In some embodiments, the sodium chloride is fed into a mixing auger 4.

In some embodiments, the mixing auger 4 mixes the sodium chloride and additives.

In some embodiments, a spray system is in fluid communication with the mixing auger 4 such that the spray system introduces additives into the mixing auger 4.

In some embodiments, the additives comprise one or both of colorant and fragrance. In some specific embodiments, the spray system introduces one or both of the colorant and the fragrance into the mixing auger 4. In some specific embodiments, the spray system introduces one or both of the colorant and the fragrance into the mixing auger 4 such that the mixing auger 4 mixes the sodium chloride with one or both of the colorant and the fragrance.

In some embodiments, the mixing auger 4 feeds into a second mixing auger 5. In some specific embodiments the mixing auger 4 feeds into a second mixing auger 5, which continues to mix the sodium chloride with one or both of the colorant and the fragrance.

In some embodiments, a bin feeds one or more of additional sodium chloride, potassium bitartrate, and sodium bicarbonate into the second mixing auger 5.

In some embodiments, the second mixing auger 5 mixes the sodium chloride, one or both of the colorant and the fragrance, and one or more of the additional sodium chloride, potassium bitartrate, and sodium bicarbonate. In some specific embodiments, the second mixing auger 5 mixes and hardens the sodium chloride, one or both of the colorant and the fragrance, and one or more of the additional sodium chloride, potassium bitartrate, and sodium bicarbonate. In some very specific embodiments, the second mixing auger 5 mixes and hardens the sodium chloride, one or both of the colorant and the fragrance, and one or more of the additional sodium chloride, potassium bitartrate, and sodium bicarbonate such that the mixture has a consistency that is similar to wet sand.

In some embodiments, the second mixing auger 5 feeds a conveyor 6 that feeds a bin 7 that is upstream of a press machine.

In some embodiments, the press machine fills and presses second fluid treatment compositions that comprise the mixture that is mixed by the second mixing auger 5.

In some embodiments, the press machine is of the type used to press charcoal briquettes such as charcoal briquettes of the type used to heat a hookah. The type of press machine 7, however, is not limiting.

In some embodiments, each second fluid treatment composition has a mass of at least 50 grams and up to 500 grams. In some specific embodiments, each second fluid treatment composition has a mass of at least 60 grams and up to 300 grams. In some very specific embodiments, each second fluid treatment composition has a mass of at least 75 grams and up to 150 grams.

In some embodiments, the second fluid treatment compositions are packaged. In some specific embodiments, the second fluid treatment compositions are packaged at least 2 hours after the second fluid treatment compositions are ejected from the press machine 7. In some very specific embodiments, the second fluid treatment compositions are packaged at least 20 hours after the second fluid treatment compositions are ejected from the press machine 7.

A representative second fluid treatment composition is shown in FIGS. 4 and 5.

Novel Second Fluid Treatment Compositions:

Various aspects of this disclosure relate to a second fluid treatment composition that is configured for use in a toilet or urinal. In some specific embodiments, the second fluid treatment composition is configured for use in a toilet or urinal that comprises a waste tank that is configured for use at temperatures below 0 degrees Celsius. In some specific embodiments, the second fluid treatment composition is configured for use in a toilet or urinal that comprises a waste tank, which does not connect to a sewer or septic tank (and which waste tank is also referred to as a holding tank herein). In some very specific embodiments, the second fluid treatment composition is configured for use in a toilet or urinal that comprises a waste tank, which does not connect to a sewer or septic tank such that waste must be removed from the waste tank.

In some embodiments, the second fluid treatment composition is configured to disperse in an aqueous liquid such that the second fluid treatment composition reduces the freezing point of the aqueous liquid by at least 1 degree Celsius per 100 grams of the second fluid treatment composition per liter of the aqueous liquid. In some specific embodiments, the second fluid treatment composition is configured to disperse in an aqueous liquid such that the second fluid treatment composition reduces the freezing point of the aqueous liquid by at least 2 degrees Celsius per 100 grams of the second fluid treatment composition per liter of the aqueous liquid. In some very specific embodiments, the second fluid treatment composition is configured to disperse in an aqueous liquid such that the second fluid treatment composition reduces the freezing point of the aqueous liquid by at least 4 degrees Celsius per 100 grams of the second fluid treatment composition per liter of the aqueous liquid. In some embodiments, the aqueous liquid comprises or consists of biological waste of the type received by a toilet or urinal.

In some embodiments, at least 50 percent by mass of the second fluid treatment composition has a solubility in water at 0 degrees Celsius of at least 100 grams per liter. In specific some embodiments, at least 70 percent by mass of the second fluid treatment composition has a solubility in water at 0 degrees Celsius of at least 100 grams per liter. In very specific some embodiments, at least 80 percent by mass of the second fluid treatment composition has a solubility in water at 0 degrees Celsius of at least 100 grams per liter.

In some embodiments, the second fluid treatment composition comprises sodium chloride.

In some embodiments, the second fluid treatment composition comprises sodium chloride at a concentration of at least 50 percent and up to 99.99 percent by mass. In some specific embodiments, the second fluid treatment composition comprises sodium chloride at a concentration of at least 70 percent and up to 99.9 percent by mass. In some very specific embodiments, the second fluid treatment composition comprises sodium chloride at a concentration of at least 90 percent and up to 99.9 percent by mass.

In some embodiments, the fluid treatment composition comprises water.

In some embodiments, the second fluid treatment composition comprises water at a concentration of at least 5 parts per million and up to 5 percent by mass. In some specific embodiments, the second fluid treatment composition comprises water at a concentration of at least 10 parts per million and up to 2 percent by mass. In some very specific embodiments, the second fluid treatment composition comprises water at a concentration of at least 20 parts per million and up to 1 percent by mass.

In some embodiments, the second fluid treatment composition comprises magnesium chloride.

In some embodiments, the second fluid treatment composition comprises magnesium chloride at a concentration of at least 5 parts per million and up to 40 percent by mass. In some specific embodiments, the second fluid treatment composition comprises magnesium chloride at a concentration of at least 10 parts per million and up to 10 percent by mass. In some very specific embodiments, the second fluid treatment composition comprises magnesium chloride at a concentration of at least 20 parts per million and up to 1 percent by mass.

In some embodiments, the second fluid treatment composition comprises a bitartrate salt. In some specific embodiments, the second fluid treatment composition comprises potassium bitartrate or sodium bitartrate. In some very specific embodiments, the second fluid treatment composition comprises potassium bitartrate. In some very specific embodiments, the second fluid treatment composition comprises sodium bitartrate.

In some embodiments, the second fluid treatment composition comprises the bitartrate salt at a concentration of at least 100 parts per million and up to 20 percent by mass. In some specific embodiments, the second fluid treatment composition comprises the bitartrate salt at a concentration of at least 0.1 percent and up to 17 percent by mass. In some very specific embodiments, the second fluid treatment composition comprises the bitartrate salt at a concentration of at least 2 percent and up to 15 percent by mass.

In some embodiments, the second fluid treatment composition comprises a bicarbonate salt. In some specific embodiments, the second fluid treatment composition comprises potassium bicarbonate or sodium bicarbonate. In some very specific embodiments, the second fluid treatment composition comprises potassium bicarbonate. In some very specific embodiments, the second fluid treatment composition comprises sodium bicarbonate.

In some embodiments, the second fluid treatment composition comprises the bicarbonate salt at a concentration of at least 100 parts per million and up to 20 percent by mass. In some specific embodiments, the second fluid treatment composition comprises the bicarbonate salt at a concentration of at least 0.1 percent and up to 17 percent by mass. In some very specific embodiments, the second fluid treatment composition comprises the bicarbonate salt at a concentration of at least 2 percent and up to 15 percent by mass.

In some embodiments, the second fluid treatment composition comprises a colorant. The colorant is not limiting, and representative colorants include LIQUITINT™ colorants (Milliken & Company), which may optionally be combined to arrive at a desirable color profile.

In some embodiments, the second fluid treatment composition comprises the colorant at a concentration of at least 1 part per million and up to 2 percent by mass. In some specific embodiments, the second fluid treatment composition comprises the colorant at a concentration of at least 5 parts per million and up to 1 percent by mass. In some very specific embodiments, the second fluid treatment composition comprises colorant at a concentration of at least 10 parts per million and up to 0.5 percent by mass.

In some embodiments, the second fluid treatment composition comprises a fragrance. The fragrance is not limiting, and representative fragrances include Apple Aire (Sunrise Environmental Scientific).

In some embodiments, the second fluid treatment composition comprises the fragrance at a concentration of at least 10 parts per million and up to 20 percent by mass. In some specific embodiments, the second fluid treatment composition comprises the fragrance at a concentration of at least 50 parts per million and up to 2 percent by mass. In some very specific embodiments, the second fluid treatment composition comprises fragrance at a concentration of at least 100 parts per million and up to 1 percent by mass.

Use of Novel Second Fluid Treatment Compositions:

In some embodiments, a second fluid treatment composition is added to a urinal of an outdoor toilet to inhibit waste from freezing in a tank or holding compartment of the outdoor toilet, which is desirable because frozen waste significantly increases the time, labor, and materials necessary to clean outdoor toilets. A second fluid treatment composition with a mass of about 120 grams generally has a lifetime of up to about two weeks depending on the usage rate of the urinal.

Figure 6:
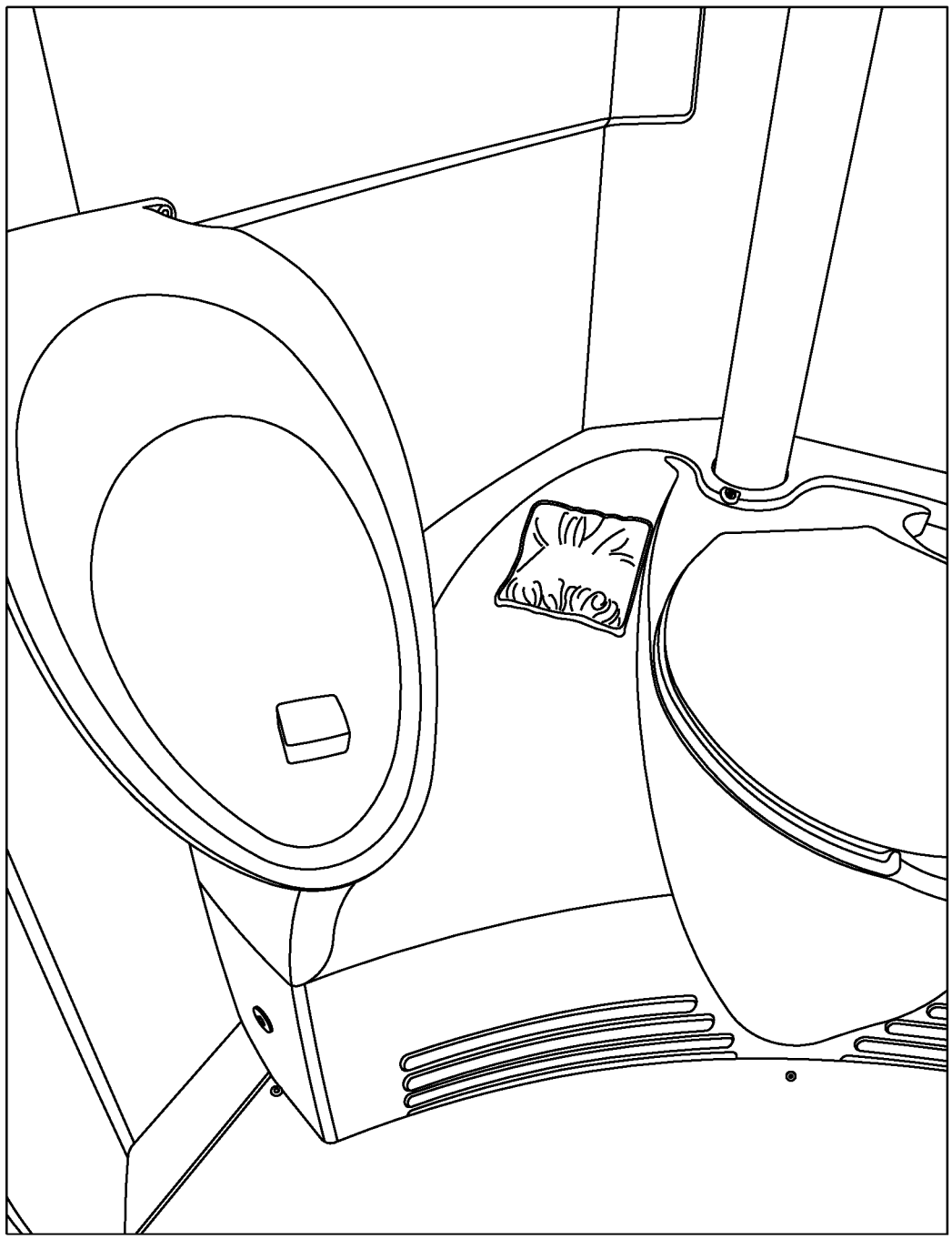
FIG. 6 is an image of a toilet system, comprising a toilet, a urinal, urinal plumbing, a waste tank, a first fluid treatment composition, and a second fluid treatment composition, wherein the second fluid treatment composition is disposed in the urinal, and a waste tank fluid treatment composition has not yet been prepared from the first fluid treatment composition.
Figure 7:
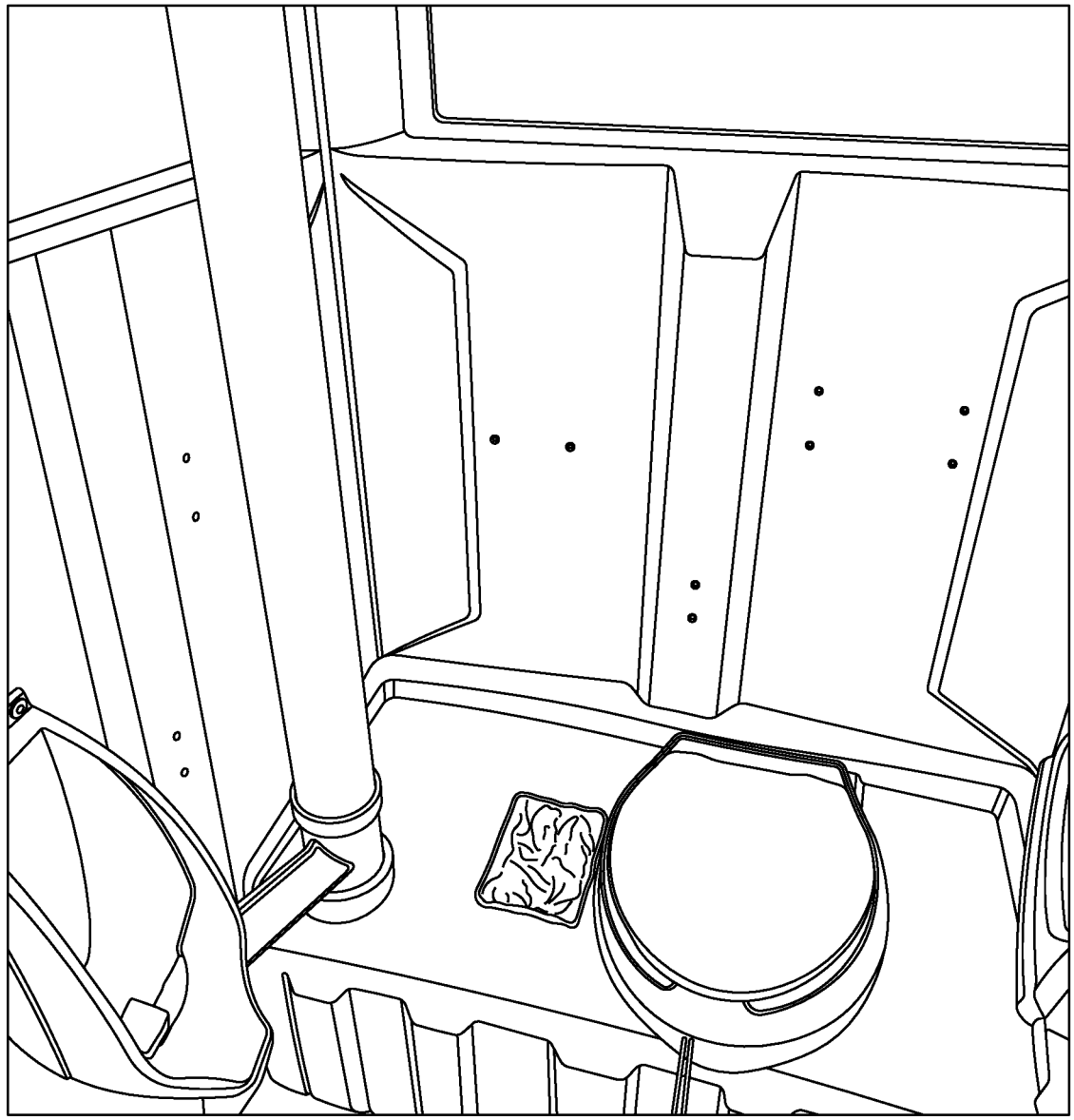
FIG. 7 is an image of a toilet system, comprising a toilet, a urinal, urinal plumbing, a waste tank, a first fluid treatment composition, and a second fluid treatment composition, wherein the second fluid treatment composition is disposed in the urinal, and a waste tank fluid treatment composition has not yet been prepared from the first fluid treatment composition.

Portable Toilet Comprising a First Fluid Treatment Composition or a Waste Tank Fluid Treatment Composition and a Second Fluid Treatment Composition:

Various aspects of this disclosure relate to a toilet system of the type as depicted in FIGS. 6 and 7 either before or after producing a waste tank fluid treatment composition from the first fluid treatment composition. FIGS. 6 and 7 both depict a toilet system prior to producing a waste tank fluid treatment composition from the first fluid treatment composition.

The toilet systems of FIGS. 6 and 7 each include a toilet, which is located on the right side of each image and includes a black toilet lid. Each toilet is in fluid communication with a waste tank of the toilet system, which is directly below each toilet.

The toilet systems of FIGS. 6 and 7 each include a urinal, which is located on the left side of each image. The toilet systems also include urinal plumbing that allows fluid communication between the urinal and the waste tank. The urinal plumbing in FIG. 7 includes a bar-shaped pipe that connects the urinal to a cylindrical pipe that connects the urinal plumbing to the waste tank. The urinal plumbing is not shown in FIG. 6, and it nevertheless exists between the urinal and the waste tank.

FIGS. 6 and 7 each show a second fluid treatment composition in their respective urinals. The second fluid treatment composition is a dark, rectangular-cuboid-shaped object in each image.

FIGS. 6 and 7 each show a first fluid treatment composition that is immediately to the left of the toilet in each image. In some embodiments, the first fluid treatment composition is inserted into the toilet (not shown). In some embodiments, the first fluid treatment composition is dispersed in water to prepare a waste tank fluid treatment composition that is inserted into the toilet (not shown).

The urinals, toilets, waste tanks, and urinal plumbing of the toilet systems of FIGS. 6 and 7 are each disposed in a housing and fixed within their respective housings. Each housing comprises walls and a floor, which are partially shown in FIGS. 6 and 7, as well as a roof and a door, which are not shown.

Toilet systems of the type depicted in FIGS. 6 and 7 are generally used by first installing the housing, which includes the components fixed within the housing, at a location. A second fluid treatment composition is typically inserted into a urinal after installing the housing at a location. A waste treatment fluid composition is typically prepared from a first fluid treatment composition by dispersing the first fluid treatment composition in water; the waste treatment fluid composition is then typically inserted into a waste tank through a toilet. The second fluid treatment composition may be inserted into a urinal prior to installing the housing at a location, after installing the housing at a location and prior to preparing a waste treatment fluid composition, or after preparing a waste treatment composition, for example, at the convenience of the operator. A waste treatment fluid composition is inserted into a waste tank typically after a housing is installed at a location, for example, to avoid splashing of the waste treatment fluid composition out of the waste tank during the installing, but the order of insertion relative to installation is not limiting. When a waste treatment fluid composition is not prepared from a first fluid treatment composition, and the first fluid treatment composition is instead inserted into a waste tank, for example, as a solid, then the order of insertion relative to installing the housing at a location is not limiting.

Modifications to the Preceding Examples:

The skilled person will recognize that the preceding examples may be modified in many ways to arrive at other novel compositions that perform similarly as the fluid treatment compositions described herein supra.

In some embodiments, one or more bins and conveyors are substituted with other means to store and feed various ingredients and compositions of the methods. The use of bins and conveyors is not limiting. The word "bin" shall not be construed as limiting, and any given bin may be substituted, for example, with a bag or funnel when allowed by context. The word "conveyor" shall not be construed as limiting and may be omitted or replaced, for example, to allow for a person to perform a conveying function or to allow non-conveyor equipment such as a cart to perform the conveying.

In some embodiments, mixing steps are combined, for example, by using a single mixing auger instead of a mixing auger and a second mixing auger or instead of using a mixing auger, a second mixing auger, and a third mixing auger.

In some embodiments, one or more mixing augers are replaced, for example, with one or more mixers (such as one or more industrial mixers).

In some embodiments, ingredients or mixtures are dried, for example, in a kiln. In some specific embodiments, mixtures that are fed from a second mixing auger are dried in a kiln, for example, instead of in a trommel screen.

In some embodiments, a first fluid treatment composition of the disclosure is provided as dried, loose material, for example, in a box or bag. In some specific embodiments, a first fluid treatment composition of the disclosure is provided as dried, loose material, for example, in a box or bag instead of in polyvinyl alcohol bags.

In some embodiments, a first fluid treatment composition of the disclosure is pelletized. In some specific embodiments, a first fluid treatment composition of the disclosure is pelletized instead of being provided in polyvinyl alcohol bags.

In some embodiments, a first fluid treatment composition of the disclosure comprises or consists of a solid composite. In some specific embodiments, a first fluid treatment composition of the disclosure comprises or consists of a solid composite instead of being provided in polyvinyl alcohol bags.

In some embodiments, a first fluid treatment composition of the disclosure is a pressed brick. In some specific embodiments, a first fluid treatment composition of the disclosure is a pressed brick instead of being provided in polyvinyl alcohol bags.

In some embodiments, a first fluid treatment composition of the disclosure is a pre-dissolved liquid. In some specific embodiments, a first fluid treatment composition of the disclosure is dissolved in an aqueous liquid (such as water) to produce a pre-dissolved liquid. In some very specific embodiments, a first fluid treatment composition of the disclosure is dissolved in an aqueous liquid (such as water) to produce a pre-dissolved liquid instead of being provided in polyvinyl alcohol bags.

Advantages of the Novel Compositions Described Above:

Sodium chloride increases the salinity of water in portable toilets. Sodium chloride also inhibits the freezing of wastewater such as wastewater held in a waste tank of a toilet. Sodium chloride also improves the stability of the shape of a fluid treatment composition. Sodium chloride is also a deodorizer that inhibits volatilization of unfavorable odors.

Magnesium chloride inhibits the freezing of wastewater such as wastewater in a waste tank of a toilet. Magnesium chloride also improves the stability of polyvinyl alcohol.

Colorants mask unfavorable waste color in toilets and on the second fluid treatment compositions of the disclosure during use.

Fragrances mask unfavorable waste odors in toilets and on the second fluid treatment compositions of the disclosure during use.

Enzymes increase the rate of degradation of waste, which improves waste handling and can decrease unfavorable odors produced from the waste.

Potassium bitartrate improves the stability of the shape of a fluid treatment composition that is a solid composite.

Sodium bicarbonate improves the stability of the shape of a fluid treatment composition that is a solid composite. Sodium bicarbonate is also a deodorizer that inhibits volatilization of unfavorable odors.

Additional Ingredients:

In some embodiments, a saline solution may be used in substitution of or in addition to one or more of sodium chloride, magnesium chloride solution, and magnesium chloride flakes.

In some embodiments, a magnesium chloride hydrate such as magnesium chloride hexahydrate may be used in substitution of or in addition to one or more of sodium chloride, magnesium chloride solution, and magnesium chloride flakes.

In some embodiments, calcium magnesium acetate may be used in substitution of or in addition to one or more of sodium chloride, magnesium chloride solution, and magnesium chloride flakes.

In some embodiments, urea may be used in substitution of or in addition to one or more of sodium chloride, magnesium chloride solution, and magnesium chloride flakes.

In some embodiments, calcium chloride may be used in substitution of or in addition to one or more of sodium chloride, magnesium chloride solution, and magnesium chloride flakes.

In some embodiments, potassium chloride may be used in substitution of or in addition to one or more of sodium chloride, magnesium chloride solution, and magnesium chloride flakes.

In some embodiments, sodium formate may be used in substitution of or in addition to one or more of sodium chloride, magnesium chloride solution, and magnesium chloride flakes.

In some embodiments, potassium formate may be used in substitution of or in addition to one or more of sodium chloride, magnesium chloride solution, and magnesium chloride flakes.

In some embodiments, sodium acetate may be used in substitution of or in addition to one or more of sodium chloride, magnesium chloride solution, and magnesium chloride flakes.

In some embodiments, sodium gluconate may be used in substitution of or in addition to one or more of sodium chloride, magnesium chloride solution, and magnesium chloride flakes.

In some embodiments, potassium sulfate may be used in substitution of or in addition to one or more of sodium chloride, magnesium chloride solution, and magnesium chloride flakes.

In some embodiments, corn-derived enhancer may be used in any of the fluid treatment compositions of the disclosure.

In some embodiments, corn-derived corrosion inhibitor may be used in any of the fluid treatment compositions of the disclosure.

In some embodiments, molasses may be used in any of the fluid treatment compositions of the disclosure.

In some embodiments, beet juice may be used in any of the fluid treatment compositions of the disclosure.

Additional Features of Some of the Embodiments:

Various aspects of the disclosure relate to a toilet system, comprising a toilet, a urinal, urinal plumbing, a waste tank, a waste tank fluid treatment composition, and a second fluid treatment composition.

In some embodiments, the waste tank fluid treatment composition and the second fluid treatment composition are configured to inhibit freezing of wastewater in the waste tank following use of the toilet system to facilitate emptying of the waste tank at sub-freezing temperatures.

In some embodiments, the toilet is in fluid communication with the waste tank. In some specific embodiments, the toilet is in fluid communication with the waste tank such that waste from the toilet is directed into the waste tank.

In some embodiments, the urinal is in fluid communication with the urinal plumbing, and the urinal plumbing is in fluid communication with the waste tank.

In some embodiments, the urinal plumbing allows fluid communication between the urinal and the waste tank.

In some embodiments, the toilet system lacks plumbing to flush waste from the toilet. In some specific embodiments, the toilet system lacks plumbing to flush waste from the toilet by rinsing waste from the toilet with water.

In this specification "water" that is not part of a composition refers to liquid water that typically comprises solutes, such as tap water, and "water" that is part of a composition refers to water molecules (i.e., $H_2O$). Water that would be used to rinse waste from a toilet or to dissolve another composition, for example, refers to liquid water that typically comprises solutes. A composition that comprises water at a specific concentration or range of concentrations, for example, refers to a concentration of water molecules.

In some embodiments, the toilet system lacks plumbing to flush waste from the urinal. In some specific embodiments, the toilet system lacks plumbing to flush waste from the urinal by rinsing waste from the urinal with water.

In some embodiments, the toilet system lacks communication with a sewer. In some specific embodiments, the toilet system lacks fluid communication with a sewer.

In some embodiments, the toilet system lacks communication with a septic tank. In some specific embodiments, the toilet system lacks fluid communication with a septic tank.

In some embodiments, the toilet system is a portable toilet.

In some embodiments, the waste tank contains the waste tank fluid treatment composition.

In some embodiments, the waste tank fluid treatment composition comprises a first salt.

In some embodiments, the first salt is selected from sodium chloride, potassium chloride, calcium chloride, magnesium chloride or a hydrate thereof, sodium acetate, calcium magnesium acetate, sodium formate, potassium formate, sodium gluconate, potassium gluconate, sodium sulfate, and potassium sulfate. In some specific embodiments, the first salt is sodium chloride.

In some embodiments, the waste tank fluid treatment composition comprises at least 500 grams of sodium chloride as one or both of sodium chloride salt and dissolved sodium chloride. In some specific embodiments, the waste tank fluid treatment composition comprises at least 500 grams of sodium chloride as dissolved sodium chloride.

In some embodiments, the waste tank lacks waste and the waste tank fluid treatment composition lacks waste. In some specific embodiments, the waste tank lacks waste and the waste tank fluid treatment composition lacks waste because the toilet system is clean and newly installed prior to any use of the toilet or urinal. In some very specific embodiments, the toilet system is newly installed and has been cleaned subsequent to prior use of the toilet or urinal.

In some embodiments, the waste tank fluid treatment composition is a liquid.

In some embodiments, the second fluid treatment composition is a solid composite. In some specific embodiments, the second fluid treatment composition is a solid composite that comprises a second salt.

In some embodiments, the second salt is selected from sodium chloride, potassium chloride, calcium chloride, magnesium chloride or a hydrate thereof, sodium acetate, calcium magnesium acetate, sodium formate, potassium formate, sodium gluconate, potassium gluconate, sodium sulfate, potassium sulfate, sodium bitartrate, potassium bitartrate, sodium bicarbonate, and potassium bicarbonate. In some specific embodiments, the second salt is sodium chloride.

In some embodiments, the second fluid treatment composition is a solid composite that comprises at least 75 grams of sodium chloride salt.

In this specification a "solid composite" is a heterogeneous mixture that has a three-dimensional shape that has sufficient structural integrity to be transported and manipulated without significant distortion to the three-dimensional shape such as by crumbling into particles. Concrete is an example of a solid composite, and a sandcastle is an example of a three-dimensional shape that consists of a heterogenous mixture, but that is not a solid composite. A portion of a solid composite may crumble into particles during ordinary transportation and manipulation, and, in such cases, the term "solid composite" refers to any heterogenous mixture that has a three-dimensional shape that has sufficient structural integrity such that greater than 95 percent of the heterogenous mixture retains its three-dimensional shape during ordinary transportation and manipulation and no greater than 5 percent of the heterogenous mixture, for example, breaks off from the greater than 95 percent of the heterogenous mixture during the ordinary transportation and manipulation.

In some embodiments, the waste tank fluid treatment composition is prepared by dispersing a first fluid treatment composition in water. In some embodiments, the waste tank fluid treatment composition is prepared by dissolving a first fluid treatment composition in water.

In some specific embodiments, the first salt of the waste tank fluid treatment composition is dissolved sodium chloride; the first salt of the first fluid treatment composition is sodium chloride salt; and the waste tank fluid treatment composition is prepared by dispersing the first fluid treatment composition in water to convert a majority of the sodium chloride salt of the first fluid treatment composition into the dissolved sodium chloride.

In some embodiments, the sodium chloride of the at least 500 grams of the waste tank fluid treatment composition is dissolved sodium chloride, and the waste tank fluid treatment composition is prepared by dispersing a first fluid treatment composition that comprises sodium chloride salt in water to convert a majority of the sodium chloride salt of the first fluid treatment composition into the dissolved sodium chloride.

In some embodiments, the first fluid treatment composition comprises a first salt.

In some embodiments, the first salt is selected from sodium chloride, potassium chloride, calcium chloride, magnesium chloride or a hydrate thereof, sodium acetate, calcium magnesium acetate, sodium formate, potassium formate, sodium gluconate, potassium gluconate, sodium sulfate, and potassium sulfate. In some specific embodiments, the first salt is sodium chloride.

In some embodiments, the first fluid treatment composition comprises sodium chloride salt at a concentration of at least 90 percent and up to 99.9 percent by mass.

In some embodiments, the first fluid treatment composition comprises at least 500 grams of the sodium chloride salt.

In some embodiments, the first fluid treatment composition comprises sodium chloride salt, one or more colorants, and one or more fragrances.

In some embodiments, the first fluid treatment composition comprises the one or more colorants at a concentration of at least 10 parts per million and up to 0.5 percent by mass.

In some embodiments, the first fluid treatment composition comprises the one or more fragrances at a concentration of at least 100 parts per million and up to 1 percent by mass.

In some embodiments, the first fluid treatment composition comprises one or more fragrances that are immiscible with water.

In some embodiments, the first fluid treatment composition has a mass of at least 500 grams and up to 1 kilogram.

In some embodiments, the first fluid treatment composition comprises a surface barrier that surrounds the rest of the first fluid treatment composition. In some specific embodiments, the first fluid treatment composition comprises a surface barrier that surrounds the rest of the first fluid treatment composition and that comprises polyvinyl alcohol.

In some embodiments, the waste tank fluid treatment composition is prepared from a first fluid treatment composition that comprises a surface barrier that surrounds the rest of the first fluid treatment composition. In some specific embodiments, the waste tank fluid treatment composition is prepared from a first fluid treatment composition that comprises a surface barrier that surrounds the rest of the first fluid treatment composition and that comprises polyvinyl alcohol.

In some embodiments, the waste tank fluid treatment composition comprises polyvinyl alcohol.

In some embodiments, the second fluid treatment composition is disposed in the urinal. In some specific embodiments, the second fluid treatment composition is disposed in the urinal such that successive portions of the solid composite dissolve upon successive use of the urinal to inhibit freezing of liquids in the urinal plumbing and to increase an amount by mass of dissolved sodium chloride in the waste tank. In some even more specific embodiments, the solid composite is configured such that successive portions of the solid composite dissolve upon successive use of a urinal except for portions of the solid composite that lack robust solubility in water. In some very specific embodiments, the solid composite is configured such that successive portions of the solid composite dissolve upon successive use of a urinal except for portions of the solid composite that lack robust solubility in water such as one or more fragrances.

In some embodiments, the solid composite comprises sodium chloride salt, one or more colorants, one or more fragrances, and a bitartrate salt selected from sodium bitartrate and potassium bitartrate.

In some embodiments, the solid composite comprises the sodium chloride salt at a concentration of at least 75 percent and up to 95 percent by mass.

In some embodiments, the solid composite comprises bitartrate salt at a concentration of at least 2 percent and up to 15 percent by mass.

In some embodiments, the solid composite comprises one or more colorants at a concentration of at least 10 parts per million and up to 0.5 percent by mass.

In some embodiments, the solid composite comprises one or more fragrances at a concentration of at least 100 parts per million and up to 1 percent by mass.

In some embodiments, the solid composite comprises one or more fragrances that are immiscible with water.

In some embodiments, the solid composite comprises at least 75 grams and up to 500 grams by mass.

Various aspects of the disclosure relate to a kit to facilitate waste removal from a waste tank in sub-freezing temperatures, comprising a first fluid treatment composition and a second fluid treatment composition.

In some embodiments, the kit is configured for use with a toilet system that comprises (1) a toilet in fluid communication with a waste tank such that waste from the toilet is directed into the waste tank and (2) urinal plumbing that allows fluid communication between a urinal and the waste tank.

In some embodiments, the first fluid treatment composition is configured for insertion into the waste tank to inhibit wastewater from freezing in the waste tank.

In some embodiments, the second fluid treatment composition is a solid composite that comprises at least 75 grams of sodium chloride.

In some embodiments, the solid composite comprises sodium chloride salt at a concentration of at least 75 percent and up to 95 percent by mass.

In some embodiments, the second fluid treatment composition is configured for placement in the urinal such that successive portions of the solid composite dissolve upon successive use of the urinal to inhibit freezing of liquids in the urinal plumbing and to increase an amount by mass of sodium chloride in the waste tank and thereby inhibit the wastewater from freezing. In some specific embodiments, the solid composite is configured such that successive portions of the solid composite dissolve upon successive use of a urinal except for portions of the solid composite that lack robust solubility in water. In some very specific embodiments, the solid composite is configured such that successive portions of the solid composite dissolve upon successive use of a urinal except for portions of the solid composite that lack robust solubility in water such as one or more fragrances.

In some embodiments, the kit is configured to treat a toilet system that lacks plumbing to flush waste from the toilet.

In some embodiments, the kit is configured to treat a toilet system that lacks plumbing to flush waste from the urinal.

In some embodiments, the kit is configured to treat a toilet system that lacks communication with a sewer.

In some embodiments, the kit is configured to treat a toilet system that lacks communication with a septic tank.

In some embodiments, the kit is configured to treat a toilet system that is a portable toilet.

In some embodiments, the first fluid treatment composition comprises up to 10 kilograms of total mass.

In some embodiments, the first fluid treatment composition comprises at least 500 grams of sodium chloride.

In some embodiments, the first fluid treatment composition comprises sodium chloride salt at a concentration of at least 90 percent and up to 99.9 percent by mass.

In some embodiments, the first fluid treatment composition comprises one or more fragrances that are immiscible with water.

In some embodiments, the first fluid treatment composition comprises a surface barrier that surrounds the rest of the first fluid treatment composition and that comprises polyvinyl alcohol.

In some embodiments, the second fluid treatment composition comprises up to 500 grams total mass.

In some embodiments, the solid composite comprises a bitartrate salt selected from sodium bitartrate and potassium bitartrate at a concentration of at least 2 percent and up to 15 percent by mass.

In some embodiments, the solid composite comprises one or more fragrances that are immiscible with water.

Various aspects of this disclosure relate to a fluid treatment composition to inhibit waste from freezing in a toilet that has a waste tank.

In some embodiments, the fluid treatment composition is configured to disperse in water and to reduce the freezing point of wastewater in the waste tank of the toilet. In some specific embodiments, the fluid treatment composition is configured to dissolve in water. In some very specific embodiments, the fluid treatment composition is configured to dissolve in water except for portions of the fluid treatment composition that lack robust solubility in water such as one or more fragrances.

In some embodiments, the fluid treatment composition has a mass of at least 100 and up to 1,000 grams. In some specific embodiments, the fluid treatment composition has a mass of at least 500 and up to 700 grams.

In some embodiments, the fluid treatment composition comprises sodium chloride salt at a concentration of at least 90 and up to 99.9 percent by mass.

In some embodiments, the sodium chloride salt has a size of 3.2 millimeters or less.

In some embodiments, the fluid treatment composition comprises magnesium chloride salt at a concentration of at least 20 parts per million and up to 1 percent by mass.

In this specification 1 percent equals 10,000 parts per million.

In some embodiments, the fluid treatment composition comprises one or more colorants at a concentration of at least 10 parts per million and up to 0.5 percent by mass.

In some embodiments, the fluid treatment composition comprises one or more fragrances at a concentration of at least 100 parts per million and up to 1 percent by mass.

In some embodiments, the fluid treatment composition comprises enzymes. In some specific embodiments, the enzymes are selected to break down waste, reduce odor, and/or improve an ability to flush waste from the waste tank. In some very specific embodiments, the fluid treatment composition comprises bacteria that comprise enzymes selected from proteases, lipases, amylases, cellulases, ureases, and xylanases.

In some embodiments, the fluid treatment composition comprises one or both of ethylenediaminetetraacetate and a salt of ethylenediaminetetraacetate.

In some embodiments, the fluid treatment composition comprises one or more surfactants. In some specific embodiments, the fluid treatment composition comprises one or more surfactants selected from alkyl sulfates, xylene sulfonates, alkyl benzene sulfonates, and one or more salts of alkyl sulfates, xylene sulfonates, and alkyl benzene sulfonates.

In some embodiments, the fluid treatment composition comprises particles that have an average particle size of at least 100 microns and up to 2 millimeters.

In some embodiments, a majority of the fluid treatment composition comprises particles that comprise a core and a coating, wherein each core consists of crystalline sodium chloride salt. In some specific embodiments, each core comprises a single crystal of sodium chloride salt.

In some embodiments, the coating comprises one, two, or each of the magnesium chloride salt, the one or more colorants, and the one or more fragrances.

In some embodiments, the fluid treatment composition comprises a surface barrier that surrounds the rest of the fluid treatment composition. In some specific embodiments, the surface barrier is water soluble. In some very specific embodiments, the surface barrier is polyvinyl alcohol.

Various aspects of this disclosure relate to a solid composite that comprises sodium chloride salt at a concentration of at least 75 and up to 95 percent by mass. In some specific embodiments, the fluid treatment composition is a urinal puck.

In some embodiments, the fluid treatment composition consists of at least 50 and up to 500 grams of the solid composite. In some specific embodiments, the fluid treatment composition comprises at least 75 and up to 150 grams of the solid composite.

In some embodiments, the sodium chloride salt has a size of 3.2 millimeters or less.

In some embodiments, the solid composite comprises crystals of sodium chloride salt that have an average particle size of at least 100 microns and up to 2 millimeters.

In some embodiments, the solid composite comprises magnesium chloride salt at a concentration of at least 20 parts per million and up to 1 percent by mass.

In some embodiments, the solid composite comprises a bitartrate salt at a concentration of at least 2 and up to 15 percent by mass. In some specific embodiments, the bitartrate salt is selected from sodium bitartrate and potassium bitartrate. In some very specific embodiments, the bitartrate salt is potassium bitartrate.

In some embodiments, the solid composite comprises a bicarbonate salt at a concentration of at least 2 and up to 15 percent by mass. In some specific embodiments, the bicarbonate salt is selected from sodium bicarbonate and potassium bicarbonate. In some very specific embodiments, the bicarbonate salt is sodium bicarbonate.

In some embodiments, the solid composite comprises one or more colorants at a concentration of at least 10 parts per million and up to 0.5 percent by mass. The one or more colorants of a solid composite are not limiting, and they can be selected, for example, from the same or different one or more colorants of a first fluid treatment composition.

In some embodiments, the solid composite comprises one or more fragrances at a concentration of at least 100 parts per million and up to 1 percent by mass. The one or more fragrances of a solid composite are not limiting, and they can be selected, for example, from the same or different one or more fragrances of a first fluid treatment composition.

In some embodiments, the solid composite is configured such that successive portions of the solid composite dissolve upon successive use of a urinal to inhibit freezing of wastewater in the urinal and in plumbing configured to direct waste away from the urinal. In some specific embodiments, the solid composite is configured such that successive portions of the solid composite dissolve upon successive use of a urinal except for portions of the solid composite that lack robust solubility in water. In some very specific embodiments, the solid composite is configured such that successive portions of the solid composite dissolve upon successive use of a urinal except for portions of the solid composite that lack robust solubility in water such as one or more fragrances.

In some embodiments, the solid composite lacks dichlorobenzene and naphthalene. Urinal cakes historically consisted primarily of aromatic hydrocarbons such as dichlorobenzene and naphthalene.

Various aspects of this disclosure relate to a method to inhibit waste from freezing in a toilet that comprises a urinal and a waste tank, comprising providing a first fluid treatment composition; introducing the first fluid treatment composition into the waste tank of the toilet; providing a second fluid treatment composition; and introducing the second fluid treatment composition into the urinal.

In some embodiments, the first fluid treatment composition comprises sodium chloride, magnesium chloride, one or more colorants, and one or more fragrances; the first fluid treatment composition comprises at least 500 grams of the sodium chloride; the sodium chloride is either sodium chloride salt or dissolved sodium chloride; and the magnesium chloride is either magnesium chloride salt or dissolved magnesium chloride.

In some embodiments, the first fluid treatment composition is a fluid treatment composition as described above.

In some embodiments, the second fluid treatment composition is a solid composite that comprises sodium chloride salt, magnesium chloride salt, one or more colorants, one or more fragrances, a bitartrate salt, and a bicarbonate salt; the second fluid treatment composition comprises at least 75 grams of the sodium chloride salt; the bitartrate salt is selected from sodium bitartrate and potassium bitartrate; and the bicarbonate salt is selected from sodium bicarbonate and potassium bicarbonate.

In some embodiments, the second fluid treatment composition is a fluid treatment composition as described above. In some specific embodiments, the second fluid treatment composition is a fluid treatment composition that comprises a solid composite as described above. In some very specific embodiments, the second fluid treatment composition is a urinal puck as described above.

In some embodiments, the toilet comprises urinal plumbing that allows fluid communication between the urinal and the waste tank; and the second fluid treatment composition is configured such that successive portions of the solid composite dissolve upon successive use of the urinal to inhibit freezing of liquids in the urinal plumbing and to increase an amount by mass of dissolved sodium chloride in wastewater of the waste tank. In some specific embodiments, the solid composite is configured such that successive portions of the solid composite dissolve upon successive use of the urinal except for portions of the solid composite that lack robust solubility in water. In some very specific embodiments, the solid composite is configured such that successive portions of the solid composite dissolve upon successive use of a urinal except for portions of the solid composite that lack robust solubility in water such as one or more fragrances.

In some embodiments, introducing both the first fluid treatment composition into the waste tank and the second fluid treatment composition into the urinal is effective to reduce the freezing point of wastewater in the waste tank. In some specific embodiments, introducing both the first fluid treatment composition into the waste tank and the second fluid treatment composition into the urinal is more effective at reducing the freezing point of wastewater in the waste tank than either composition alone. In some very specific embodiments, introducing both the first fluid treatment composition into the waste tank and the second fluid treatment composition into the urinal is synergistically effective at reducing the freezing point of wastewater in the waste tank.

In some embodiments, the first fluid treatment composition has a mass of at least 500 and up to 1,000 grams; the first fluid treatment composition comprises sodium chloride salt at a concentration of at least 90 and up to 99.9 percent by mass; the first fluid treatment composition comprises magnesium chloride salt at a concentration of at least 20 parts per million and up to 1 percent by mass; the first fluid treatment composition comprises the one or more colorants at a concentration of at least 10 parts per million and up to 0.5 percent by mass; the first fluid treatment composition comprises the one or more fragrances at a concentration of at least 100 parts per million and up to 1 percent by mass; and the first fluid treatment composition comprises a surface barrier that surrounds the rest of the first fluid treatment composition and that comprises polyvinyl alcohol.

In some embodiments, the first fluid treatment composition comprises enzymes. In some specific embodiments, the enzymes are selected to break down waste, reduce odor, and/or improve an ability to flush waste from the waste tank. In some very specific embodiments, the first fluid treatment composition comprises bacteria that comprise enzymes selected from proteases, lipases, amylases, cellulases, ureases, and xylanases.

In some embodiments, the first fluid treatment composition comprises one or both of ethylenediaminetetraacetate and a salt of ethylenediaminetetraacetate.

In some embodiments, the first fluid treatment composition comprises one or more surfactants. In some specific embodiments, the first fluid treatment composition comprises one or more surfactants selected from alkyl sulfates, xylene sulfonates, alkyl benzene sulfonates, and one or more salts of alkyl sulfates, xylene sulfonates, and alkyl benzene sulfonates.

In some embodiments, providing the first fluid treatment composition comprises dispersing the first fluid treatment composition in water to produce an aqueous composition; and introducing the first fluid treatment composition into the waste tank comprises introducing the aqueous composition into the waste tank. In some specific embodiments, providing the first fluid treatment composition comprises dissolving substantially all of the first fluid treatment composition in water.

In some embodiments, the second fluid treatment composition comprises 75 to 500 grams of the solid composite; the solid composite comprises the sodium chloride salt at a concentration of at least 90 and up to 99.9 percent by mass; the solid composite comprises the magnesium chloride salt at a concentration of at least 2 and up to 15 percent by mass; the solid composite comprises the bitartrate salt at a concentration of at least 20 parts per million and up to 1 percent by mass; the solid composite comprises the bicarbonate salt at a concentration of at least 2 percent and up to 15 percent by mass; the solid composite comprises the one or more colorants at a concentration of at least 10 parts per million and up to 0.5 percent by mass; and the solid composite comprises the one or more fragrances at a concentration of at least 100 parts per million and up to 1 percent by mass.

In some embodiments, the method comprises emptying waste from the waste tank following use of the toilet, wherein the emptying is performed at a temperature of less than −7 degrees Celsius (less than 20 degrees Fahrenheit); the waste comprises wastewater; and the wastewater is capable of being pumped. In some specific embodiments, the wastewater is sufficiently fluid to be pumped during the emptying. In some very specific embodiments, less than 5 percent of the wastewater of the waste is frozen during the emptying.

All measurements disclosed above can be varied for varying circumstances, uses, and objects. They may be varied by ranges of plus or minus 1% through up to 40% with the ranges in some embodiments varying by differing amounts for differing aspects of a given composition and ingredients for its manufacture. Some embodiments may vary in size from 40% greater to as large as desired, such as 5000% greater or even more for massive systems.

The foregoing detailed description has described some specific embodiments. However, the illustrative embodiments above are not intended to be exhaustive or to limit the invention to the precise forms disclosed. Many modifications and variations are possible in view of the above teachings. The embodiments were chosen and described to explain the principles of the present systems and methods and their practical applications to thereby enable others skilled in the art to best utilize the present systems, their components, and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification, are interchangeable with and have the same meaning as the word "comprising."

Unless otherwise indicated, all numbers or expressions, such as those expressing dimensions, physical characteristics, and the like, used in this specification are understood to be modified in all instances by the term "approximately." All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable, and thus range, from within minus 90% to plus 3000% and thus provide support for claims that recite such values or any and all ranges or subranges that can be formed by such values. For example, a stated numerical value of 8 should be understood to be capable of varying from 0.8 (minus 90%) to 240 (plus 3000%).

Finally, it is to be understood that embodiments of the present composition and methods of use and making have been described in association with human toilets. Embodiments of the present composition and methods can be utilized with other animals, such as pets and livestock, and possibly other environments as well.

What is claimed is:

1. A kit to facilitate waste removal from a waste tank in sub-freezing temperatures, the kit comprising a first fluid treatment composition and a second fluid treatment composition, wherein:
   the kit is configured for use with a toilet system that comprises (1) a toilet in fluid communication with the waste tank and (2) urinal plumbing that allows fluid communication between a urinal and the waste tank;
   the first fluid treatment composition is configured for insertion into the waste tank to inhibit wastewater from freezing in the waste tank;
   the first fluid treatment composition comprises at least 500 grams of sodium chloride;
   the first fluid treatment composition comprises up to 10 kilograms of total mass;
   the second fluid treatment composition is a solid composite that comprises at least 75 grams of sodium chloride;
   the second fluid treatment composition is configured for placement in the urinal such that successive portions of the solid composite dissolve upon successive use of the urinal to inhibit freezing of liquids in the urinal plumbing and to increase an amount by mass of sodium chloride in the waste tank and thereby inhibit the wastewater from freezing; and
   the second fluid treatment composition comprises up to 500 grams of total mass.

2. A kit to facilitate waste removal from a waste tank in sub-freezing temperatures, the kit comprising a first fluid treatment composition and a second fluid treatment composition, wherein:
   the kit is configured for use with a toilet system that comprises (1) a toilet in fluid communication with the waste tank, and (2) urinal plumbing that allows fluid communication between a urinal and the waste tank;
   the first fluid treatment composition is configured for insertion into the waste tank;
   the first fluid treatment composition comprises a first salt;
   the second fluid treatment composition is configured for placement in the urinal;
   the second fluid treatment composition is a solid composite that comprises a second salt; and
   the first fluid treatment composition consists of a surface barrier and a rest of the first fluid treatment composition, wherein the surface barrier both comprises polyvinyl alcohol and surrounds the rest of the first fluid treatment composition.

3. A kit to facilitate waste removal from a waste tank in sub-freezing temperatures, the kit comprising a first fluid treatment composition and a second fluid treatment composition, wherein:
   the kit is configured for use with a toilet system that comprises (1) a toilet in fluid communication with the waste tank, and (2) urinal plumbing that allows fluid communication between a urinal and the waste tank;
   the first fluid treatment composition is configured for insertion into the waste tank;
   the first fluid treatment composition comprises a first salt;
   the second fluid treatment composition is configured for placement in the urinal;
   the second fluid treatment composition is a solid composite that comprises a second salt; and
   the solid composite comprises a bitartrate salt selected from sodium bitartrate and potassium bitartrate at a concentration of at least 2 percent and up to 15 percent by mass.

4. The kit of claim 1, wherein:
   the first fluid treatment composition consists of a surface barrier and a rest of the first fluid treatment composition;
   the surface barrier comprises polyvinyl alcohol; and
   the surface barrier surrounds the rest of the first fluid treatment composition.

5. The kit of claim 1, wherein the solid composite comprises a bitartrate salt selected from sodium bitartrate and potassium bitartrate at a concentration of at least 2 percent and up to 15 percent by mass.

6. The kit of claim 1, wherein:
   the urinal plumbing is in fluid communication with the urinal and the waste tank;
   the first fluid treatment composition comprises sodium chloride at a concentration of at least 90 percent and up to 99.9 percent by mass;
   the first fluid treatment composition consists of a surface barrier and a rest of the first fluid treatment composition;
   the surface barrier comprises polyvinyl alcohol;
   the surface barrier surrounds the rest of the first fluid treatment composition;
   the solid composite comprises sodium chloride at a concentration of at least 75 percent and up to 95 percent by mass; and
   the solid composite comprises a bitartrate salt selected from sodium bitartrate and potassium bitartrate at a concentration of at least 2 percent and up to 15 percent by mass.

7. The kit of claim 2, wherein:
   the first salt is sodium chloride salt; and
   the first fluid treatment composition comprises at least 500 grams of the sodium chloride salt.

8. The kit of claim 2, wherein:
   the first salt is sodium chloride salt;
   the first fluid treatment composition comprises at least 500 grams of the sodium chloride salt; and
   the first fluid treatment composition comprises the sodium chloride salt at a concentration of at least 90 percent and up to 99.9 percent by mass.

9. The kit of claim 2, wherein:
   the second salt is sodium chloride salt; and
   the solid composite comprises at least 75 grams of the sodium chloride salt.

10. The kit of claim 2, wherein:
    the second salt is sodium chloride salt;
    the solid composite comprises at least 75 grams of the sodium chloride salt; and
    the second fluid treatment composition comprises up to 500 grams of total mass.

11. The kit of claim 2, wherein:
    the first salt and the second salt are both sodium chloride salt;
    the first fluid treatment composition comprises the sodium chloride salt at a concentration of at least 90 percent and up to 99.9 percent by mass;
    the first fluid treatment composition comprises at least 500 grams of the sodium chloride salt;

the first fluid treatment composition comprises up to 10 kilograms of total mass;
the solid composite comprises at least 75 grams of the sodium chloride salt;
the solid composite comprises the sodium chloride salt at a concentration of at least 75 percent and up to 95 percent by mass; and
the second fluid treatment composition comprises up to 500 grams of total mass.

12. The kit of claim 2, wherein the solid composite comprises a bitartrate salt selected from sodium bitartrate and potassium bitartrate at a concentration of at least 2 percent and up to 15 percent by mass.

13. The kit of claim 2, wherein:
the urinal plumbing is in fluid communication with the urinal and the waste tank;
the first salt and the second salt are both sodium chloride salt;
the first fluid treatment composition comprises at least 500 grams of the sodium chloride salt;
the first fluid treatment composition comprises up to 10 kilograms of total mass;
the solid composite comprises at least 75 grams of the sodium chloride salt;
the second fluid treatment composition comprises up to 500 grams of total mass; and
the solid composite comprises a bitartrate salt selected from sodium bitartrate and potassium bitartrate at a concentration of at least 2 percent and up to 15 percent by mass.

14. The kit of claim 3, wherein:
the first salt is sodium chloride salt; and
the first fluid treatment composition comprises at least 500 grams of the sodium chloride salt.

15. The kit of claim 3, wherein:
the first salt is sodium chloride salt;
the first fluid treatment composition comprises at least 500 grams of the sodium chloride salt; and
the first fluid treatment composition comprises up to 10 kilograms of total mass.

16. The kit of claim 3, wherein:
the second salt is sodium chloride salt; and
the solid composite comprises at least 75 grams of the sodium chloride salt.

17. The kit of claim 3, wherein:
the second salt is sodium chloride salt;
the solid composite comprises at least 75 grams of the sodium chloride salt; and
the second fluid treatment composition comprises up to 500 grams of total mass.

18. The kit of claim 3, wherein:
the first salt and the second salt are both sodium chloride salt;
the first fluid treatment composition comprises at least 500 grams of the sodium chloride salt;
the first fluid treatment composition comprises up to 10 kilograms of total mass;
the solid composite comprises at least 75 grams of the sodium chloride salt; and
the second fluid treatment composition comprises up to 500 grams of total mass.

19. The kit of claim 3, wherein:
the first fluid treatment composition consists of a surface barrier and a rest of the first fluid treatment composition;
the surface barrier comprises polyvinyl alcohol; and
the surface barrier surrounds the rest of the first fluid treatment composition.

20. The kit of claim 3, wherein:
the urinal plumbing is in fluid communication with the urinal and the waste tank;
the first salt and the second salt are both sodium chloride salt;
the first fluid treatment composition comprises at least 500 grams of the sodium chloride salt;
the first fluid treatment composition comprises the sodium chloride salt at a concentration of at least 90 percent and up to 99.9 percent by mass;
the first fluid treatment composition comprises up to 10 kilograms of total mass;
the first fluid treatment composition consists of a surface barrier and a rest of the first fluid treatment composition;
the surface barrier comprises polyvinyl alcohol;
the surface barrier surrounds the rest of the first fluid treatment composition;
the solid composite comprises at least 75 grams of the sodium chloride salt;
the solid composite comprises the sodium chloride salt at a concentration of at least 75 percent and up to 95 percent by mass; and
the second fluid treatment composition comprises up to 500 grams of total mass.

\* \* \* \* \*